United States Patent
Yoo et al.

(10) Patent No.: US 10,356,770 B2
(45) Date of Patent: Jul. 16, 2019

(54) TECHNIQUES FOR USING AN ENHANCED PHYSICAL CONTROL FORMAT INDICATOR CHANNEL TO IDENTIFY CHARACTERISTICS OF A CONTROL REGION INCLUDING A SET OF PHYSICAL DOWNLINK CONTROL CHANNELS

(71) Applicant: QUALCOMM Incorporated, San Diego, CA (US)

(72) Inventors: Taesang Yoo, Riverside, CA (US); Jing Sun, San Diego, CA (US); Xiaoxia Zhang, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 15/258,445

(22) Filed: Sep. 7, 2016

(65) Prior Publication Data
US 2017/0099653 A1    Apr. 6, 2017

Related U.S. Application Data

(60) Provisional application No. 62/235,942, filed on Oct. 1, 2015.

(51) Int. Cl.
*H04W 72/04* (2009.01)
*H04W 48/16* (2009.01)
(Continued)

(52) U.S. Cl.
CPC ........... *H04W 72/042* (2013.01); *H04L 5/001* (2013.01); *H04L 5/0007* (2013.01);
(Continued)

(58) Field of Classification Search
CPC .......................... H04W 72/042; H04W 48/16
See application file for complete search history.

(56) References Cited

U.S. PATENT DOCUMENTS

2009/0168922 A1* 7/2009 Malladi ............... H04L 1/0038
375/316
2010/0260117 A1* 10/2010 Ojala .................. H04W 52/146
370/329
(Continued)

OTHER PUBLICATIONS

ISA/EP, International Search Report and Written Opinion of the International Searching Authority, Int'l Application No. PCT/US2016/050629, dated Nov. 17, 2016, European Patent Office, Rijswijk, NL, 15 pgs.
(Continued)

*Primary Examiner* — Ronald B Abelson
(74) *Attorney, Agent, or Firm* — Holland & Hart LLP

(57) ABSTRACT

Techniques are described for wireless communication. A method for wireless communication at a base station includes determining a set of physical downlink control channels (PDCCHs) to be transmitted in a control region; transmitting an enhanced physical control format indicator channel (ePCFICH) identifying a quantity of PDCCHs in the set of PDCCHs associated with each aggregation level of at least one aggregation level, and a size of the control region; and transmitting the set of PDCCHs in the control region on a component carrier deployed in a radio frequency spectrum band. A method for wireless communication at a user equipment (UE) device includes receiving the ePCFICH; receiving the control region; and searching for at least one PDCCH within the control region based at least in part on receiving the ePCFICH.

20 Claims, 17 Drawing Sheets

(51) Int. Cl.
H04L 5/00 (2006.01)
H04L 27/26 (2006.01)

(52) U.S. Cl.
CPC .......... *H04L 5/0053* (2013.01); *H04L 5/0094* (2013.01); *H04L 27/2602* (2013.01); *H04W 48/16* (2013.01); *H04L 5/0064* (2013.01)

(56) References Cited

U.S. PATENT DOCUMENTS

| | | | | |
|---|---|---|---|---|
| 2010/0302983 | A1* | 12/2010 | McBeath | H04L 5/0005 370/311 |
| 2011/0243012 | A1* | 10/2011 | Luo | H04W 72/04 |
| 2011/0299489 | A1 | 12/2011 | Kim et al. | |
| 2013/0039284 | A1 | 2/2013 | Marinier et al. | |
| 2013/0183987 | A1 | 7/2013 | Vrzic et al. | |
| 2013/0242924 | A1* | 9/2013 | Kim | H04W 72/042 |
| 2014/0105157 | A1 | 4/2014 | Yang et al. | |
| 2014/0293858 | A1* | 10/2014 | Kalhan | H04W 36/0072 370/311 |

OTHER PUBLICATIONS

NTT DOCOMO, "DL Control Channel Enhancement for DL MIMO in Rel-11", 3GPP TSG RAN WG1 Meeting #65, R1-111636, Barcelona, Spain, May 9-13, 2011, 6 pgs., Release 11, 3rd Generation Partnership Project.

* cited by examiner

TECHNIQUES FOR USING AN ENHANCED PHYSICAL CONTROL FORMAT INDICATOR CHANNEL TO IDENTIFY CHARACTERISTICS OF A CONTROL REGION INCLUDING A SET OF PHYSICAL DOWNLINK CONTROL CHANNELS

CROSS REFERENCE

The present application for patent claims priority to U.S. Provisional Patent Application No. 62/235,942 by Yoo et al., entitled "Techniques For Using An Enhanced Physical Control Format Indicator Channel To Identify Characteristics Of A Control Region Including A Set Of Physical Downlink Control Channels," filed Oct. 1, 2015, assigned to the assignee hereof.

BACKGROUND

Field of the Disclosure

The present disclosure, for example, relates to wireless communication systems, and more particularly to techniques for using an enhanced physical control format indicator channel (ePCFICH) to identify characteristics of a control region including a set of physical downlink control channels (PDCCHs).

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. A wireless multiple-access communication system may include a number of base stations, each simultaneously supporting communication for multiple communication devices, otherwise known as user equipment (UE) devices.

In some wireless communication systems, base stations and UE devices may communicate on one or more enhanced component carriers (eCCs) in a contention-based radio frequency spectrum band. LTE/LTE-A signals may also be transmitted or received over a contention-based radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)). Base stations and UE devices may also communicate on one or more eCCs in a contention-free radio frequency spectrum band. A contention-free radio frequency spectrum band may be a radio frequency spectrum band for which transmitting devices may not contend for access because the radio frequency spectrum band is licensed to particular users for particular uses (e.g., a licensed radio frequency spectrum band usable for LTE/LTE-A communications). In at least some scenarios, the configurations or formats of physical channels (e.g., PDCCHs, PCFICHs, physical downlink control channels (PDSCHs), etc.) optimized for non-eCCs may not be suitable for transmission on eCCs.

SUMMARY

The present disclosure, for example, relates to techniques for using an ePCFICH to identify characteristics of a control region including a set of PDCCHs. The characteristics may include, for example, a size of the control region and a quantity of PDCCHs (in the control region) associated with each aggregation level of at least one aggregation level. Such an ePCFICH can reduce latency, false positive PDDCH identifications, and/or PDCCH scheduling complexity.

In a first set of illustrative examples, a method for wireless communication at a base station is described. The method may include determining a set of PDCCHs to be transmitted in a control region; transmitting an ePCFICH identifying a quantity of PDCCHs in the set of PDCCHs associated with each aggregation level of at least one aggregation level, and a size of the control region; and transmitting the set of PDCCHs in the control region on a component carrier deployed in a radio frequency spectrum band.

In some examples of the method, the at least one aggregation level may include a plurality of aggregation levels. In some examples, the PDCCHs may be transmitted in the control region in a predetermined order based at least in part on the plurality of aggregation levels. In some examples, the method may include restricting a UE device to searching for PDCCHs associated with a subset of a plurality of aggregation levels. In some examples, the method may include restricting a UE device to searching for PDCCHs within a restricted search space of the control region.

In some examples of the method, the control region may occupy a first fraction of a symbol period. In some examples, the method may include transmitting at least a portion of a PDSCH in a second fraction of the symbol period. In some examples, the method may include boosting the transmit power of at least one PDCCH transmitted in the control region based at least in part on the control region occupying the first fraction of the symbol period.

In some examples of the method, the ePCFICH may identify a first quantity of PDCCHs in the set of PDCCHs associated with a first aggregation level of the at least one aggregation level by identifying a plurality of modulation orders associated with the first quantity of PDCCHs, and a plurality of sub-quantities of the first quantity of PDCCHs associated with each modulation order of the plurality of modulation orders. In some examples, determining the set of PDCCHs to be transmitted in the control region may include formatting a subset of PDCCHs for a single UE device using a same aggregation level. In some examples, the component carrier may include an eCC.

In a second set of illustrative examples, a device for wireless communication is described. The device may include means for determining a set of PDCCHs to be transmitted in a control region; means for transmitting an ePCFICH identifying a quantity of PDCCHs in the set of PDCCHs associated with each aggregation level of at least one aggregation level, and a size of the control region; and means for transmitting the set of PDCCHs in the control region on a component carrier deployed in a radio frequency spectrum band. In some examples, the device may further include means for implementing one or more aspects of the method for wireless communication described above with respect to the first set of illustrative examples.

In a third set of illustrative examples, another device for wireless communication is described. The device may include a processor, memory in electronic communication with the processor, and instructions stored in the memory. The instructions may be executable by the processor to determine a set of PDCCHs to be transmitted in a control region; to transmit an ePCFICH identifying a quantity of PDCCHs in the set of PDCCHs associated with each aggregation level of at least one aggregation level, and a size of the control region; and to transmit the set of PDCCHs in the control region on a component carrier deployed in a radio frequency spectrum band. In some examples, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communication is described. The code may be executable by a processor to determine a set of PDCCHs to be transmitted in a control region; to transmit an ePCFICH identifying a quantity of PDCCHs in the set of PDCCHs associated with each aggregation level of at least one aggregation level, and a size of the control region; and to transmit the set of PDCCHs in the control region on a component carrier deployed in a radio frequency spectrum band. In some examples, the computer-readable medium may also include computer-executable code to implement one or more aspects of the method for wireless communication described above with respect to the first set of illustrative examples.

In a fifth set of illustrative examples, a method for wireless communication at a UE device is described. The method may include receiving an ePCFICH identifying a quantity of PDCCHs associated with each aggregation level of at least one aggregation level, and a size of a control region including a set of PDCCHs; receiving the control region, including the set of PDCCHs, on a component carrier deployed in a radio frequency spectrum band; and searching for at least one PDCCH within the control region based at least in part on receiving the ePCFICH.

In some examples of the method, the at least one aggregation level may include a plurality of aggregation levels. In some examples, the PDCCHs may be received in the control region in a predetermined order based at least in part on the plurality of aggregation levels. In some examples, the method may include receiving a restriction to search for the at least one PDCCH within a subset of PDCCHs associated with a subset of a plurality of aggregation levels. In some examples, the method may include receiving a restriction to search for the at least one PDCCH within a restricted search space of the control region.

In some examples of the method, the control region may occupy a first fraction of a symbol period. In some examples, the method may include receiving at least a portion of a PDSCH in a second fraction of the symbol period. In some examples, the method may include receiving the at least one PDCCH in the control region at a boosted transmit power based at least in part on the control region occupying the first fraction of the symbol period.

In some examples of the method, the ePCFICH may identify a first quantity of PDCCHs in the set of PDCCHs associated with a first aggregation level of the at least one aggregation level by identifying a plurality of modulation orders associated with the first quantity of PDCCHs, and a plurality of sub-quantities of the first quantity of PDCCHs associated with each modulation order of the plurality of modulation orders. In some examples, the method may include searching for a plurality of PDCCHs having a same aggregation level. In some examples, the component carrier may include an eCC.

In a sixth set of illustrative examples, another device for wireless communication is described. The device may include means for receiving an ePCFICH identifying a quantity of PDCCHs associated with each aggregation level of at least one aggregation level, and a size of a control region including a set of PDCCHs; means for receiving the control region, including the set of PDCCHs, on a component carrier deployed in a radio frequency spectrum band; and means for searching for at least one PDCCH within the control region based at least in part on receiving the ePCFICH. In some examples, the device may further include means for implementing one or more aspects of the method for wireless communication described above with respect to the fifth set of illustrative examples.

In a seventh set of illustrative examples, another device for wireless communication is described. The device may include a processor, memory in electronic communication with the processor, and instructions stored in the memory. The instructions may be executable by the processor to receive an ePCFICH identifying a quantity of PDCCHs associated with each aggregation level of at least one aggregation level, and a size of a control region including a set of PDCCHs; to receive the control region, including the set of PDCCHs, on a component carrier deployed in a radio frequency spectrum band; and to search for at least one PDCCH within the control region based at least in part on receiving the ePCFICH. In some examples, the instructions may also be executable by the processor to implement one or more aspects of the method for wireless communication described above with respect to the fifth set of illustrative examples.

In an eighth set of illustrative examples, another non-transitory computer-readable medium storing computer-executable code for wireless communication is described. The code may be executable by a processor to receive an ePCFICH identifying a quantity of PDCCHs associated with each aggregation level of at least one aggregation level, and a size of a control region including a set of PDCCHs; to receive the control region, including the set of PDCCHs, on a component carrier deployed in a radio frequency spectrum band; and to search for at least one PDCCH within the control region based at least in part on receiving the ePCFICH. In some examples, the computer-readable medium may also include computer-executable code to implement one or more aspects of the method for wireless communication described above with respect to the fifth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
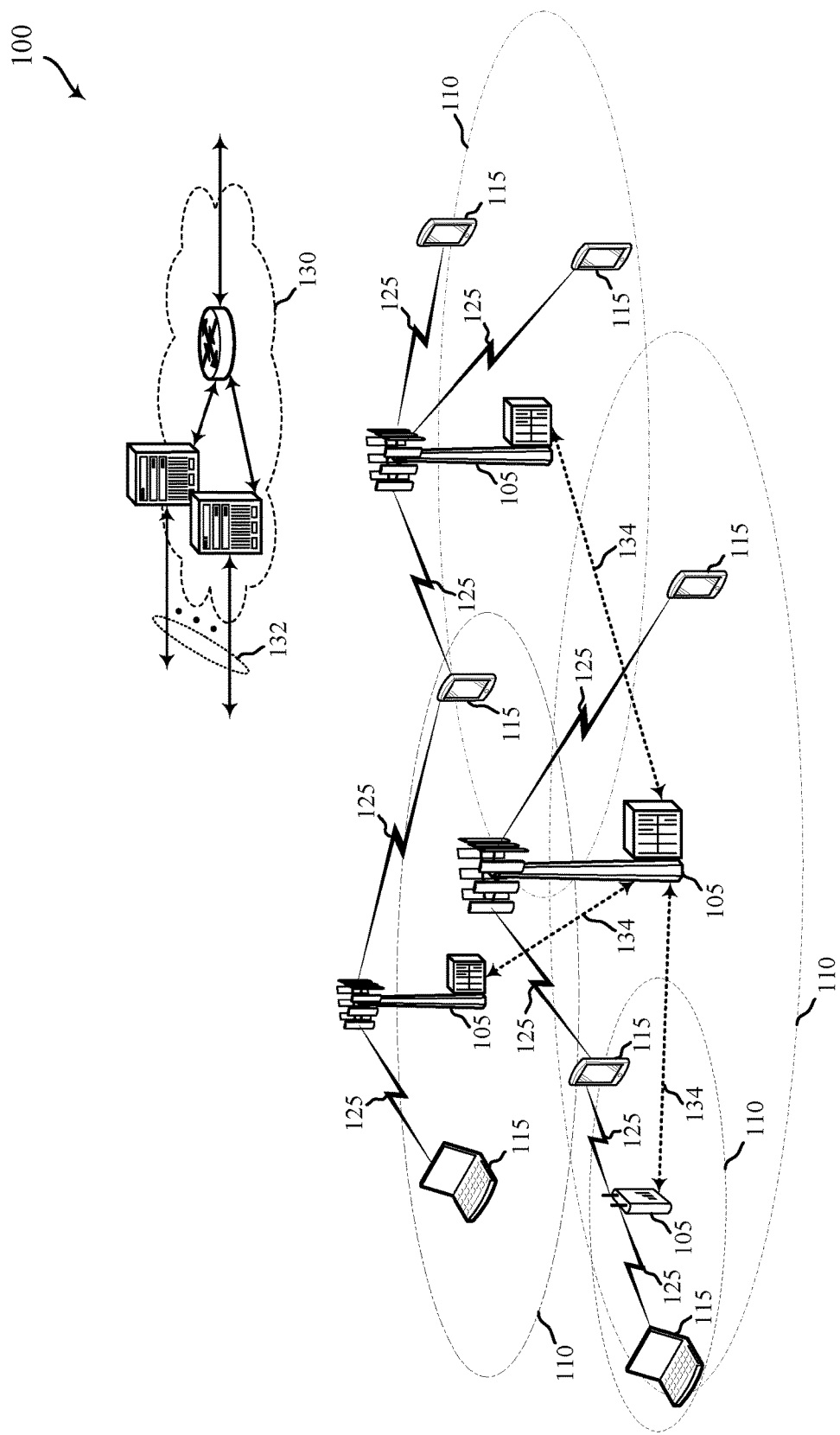
FIG. 1 shows an example of a wireless communication system, in accordance with various aspects of the present disclosure.

Some wireless communication systems may use enhanced component carriers (eCCs) to improve throughput, latency, or reliability of wireless communications. An eCC may be characterized by a short symbol duration, wide tone spacing, short subframe duration, operation in contention-based spectrum, or wide bandwidth. In some cases, an eCC-capable base station may support both non-eCC and eCC communications. An eCC may have a relatively wide system bandwidth (e.g. 80 MHz or 100 MHz) as compared to a non-eCC (e.g., a LTE/LTE-A component carrier (CC), Licensed Assisted Access (LAA) CC, or Stand Alone CC in a contention-based radio frequency spectrum band), which may have a relatively smaller bandwidth (e.g. 20 MHz). An eCC may include one or more channels (e.g., segments of bandwidth, such as four 20 MHz segments of bandwidth) that may be continuous or discontinuous in frequency. Non-eCC user equipment (UE) devices may be served within an eCC. In some cases, non-eCC UE devices may be served on a subset of channels within an eCC. The channels in which non-eCC UE devices are served may be referred to as primary channels, and the channels in which non-eCC UE devices are not served may be referred to as secondary channels. eCC UE devices may be served on both primary and secondary channels, as a wideband eCC spans both primary and secondary channels.

In at least some scenarios, the configurations or formats of physical channels (e.g., physical downlink control channels (PDCCHs), physical control format indicator channels (PCFICHs), physical downlink shared channels (PDSCHs), etc.) optimized for non-eCCs may not be suitable for transmission on eCCs. For example, in a Long Term Evolution (LTE) or LTE-Advanced (LTE-A) communication system, a UE device may receive a PCFICH indicating a size of a control region including a set of PDCCHs. This limited information may enable a UE device to determine where to look for PDCCHs, but may require a UE device to search for a PDCCH (and perform at least one blind decode) beginning at each control channel element (CCE) starting location within the control region. When PDCCHs may assume one of a plurality of aggregation levels (e.g., when a PDCCH may include an aggregation of 1, 2, 4, or 8 CCEs), a UE device may need to perform a plurality of blind decodes beginning at each CCE starting location within the control region. The performance of each blind decode may increase control region and/or PDCCH processing latency, and can increase the likelihood of false positive PDCCH identifications. In some cases, a base station may reduce the number of blind decodes performed by a UE device by restricting the UE device's search space within a control region. However, restricting a UE device's search space can increase PDCCH scheduling complexity. Techniques described in the present disclosure use an enhanced physical control format indicator channel (ePCFICH) to identify a size of a control region and also a quantity of PDCCHs in the control region associated with each aggregation level of at least one aggregation level. Such an ePCFICH can reduce latency, false positive PDDCH identifications, and/or PDCCH scheduling complexity.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors (not shown) making up a portion of the coverage area. The wireless communication system 100 may include base stations 105 of different types (e.g., macro or small cell base stations). There may be overlapping geographic coverage areas 110 for different technologies.

In some examples, the wireless communication system 100 may include an LTE/LTE-A network and may employ narrowband communication techniques, as described below. In LTE/LTE-A networks, the term evolved Node B may be used to describe the base stations 105. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UE devices with service subscriptions with the network provider. A small cell may be a lower-powered base station, as compared with a macro cell that may operate in the same or different (e.g., contention-free, contention-based, etc.) radio frequency spectrum bands as macro cells. Small cells may include pico cells, femto cells, and micro cells according to various examples. A pico cell may cover a relatively smaller geographic area and may allow unrestricted access by UE devices with service subscriptions with the network provider. A femto cell also may cover a relatively small geographic area (e.g., a home) and may provide restricted access by UE devices having an association with the femto cell (e.g., UE devices in a closed subscriber group (CSG), UE devices for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a NB-LTE device, a M2M device, a MTC device, a NB-IoT device or the like. A UE device may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, or uplink (UL) transmissions, from a UE 115 to a base station 105. The DL transmissions may also be called forward link transmissions, while the UL transmissions may also be called reverse link transmissions. The communication links 125 may include dedicated PUCCH resources for narrowband communication, as described in the present disclosure.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

In some examples, the wireless communication system 100 may support operation over a contention-free radio frequency spectrum band (e.g., a radio frequency spectrum band for which transmitting apparatuses may not contend for access because the radio frequency spectrum band is licensed to particular users for particular uses (e.g., a licensed radio frequency spectrum band usable for LTE/LTE-A communications)) or a contention-based radio frequency spectrum band (e.g., a radio frequency spectrum band for which transmitting apparatuses may contend for access (e.g., a radio frequency spectrum band that is available for unlicensed use, such as Wi-Fi use, a radio frequency spectrum band that is available for use by different radio access technologies, or a radio frequency spectrum band that is available for use by multiple operators in an equally shared or prioritized manner)). Upon winning contention for access to a channel of the contention-based radio frequency spectrum band, a transmitting apparatus (e.g., a base station 105 or UE 115) may transmit one or more channel reservation signals (e.g., one or more channel usage beacon signals (CUBS) over the channel. The CUBS may reserve the channel by providing a detectable energy on the channel. The CUBS may also serve to identify the transmitting apparatus or synchronize the transmitting apparatus and a receiving apparatus.

In some cases, the wireless communication system 100 may utilize one or more eCCs. An eCC may be characterized by one or more features including: wide bandwidth, short symbol duration, wide tone spacing, smaller transmission time intervals (TTIs), and operation in a contention-based radio frequency spectrum band. In some cases, an eCC may be associated with a carrier aggregation (CA) configuration or a dual connectivity configuration (e.g., when multiple serving cells have a suboptimal backhaul link). In some examples, an eCC may be referred to by different names in different radio access technologies. For example, in 5G, sometimes known as new radio (NR), an eCC may be referred to as NR shared spectrum. The features (including functions, techniques, methods, implementing devices, etc.) of the eCC described herein, including techniques and devices for using an ePCFICH to identify characteristics of a control region including a set of PDCCHs, may apply in different radio access technologies such as 5G or NR. Even though such features may be called by different names for different radio access technologies, such features are within the scope of the present disclosure.

Figure 2:
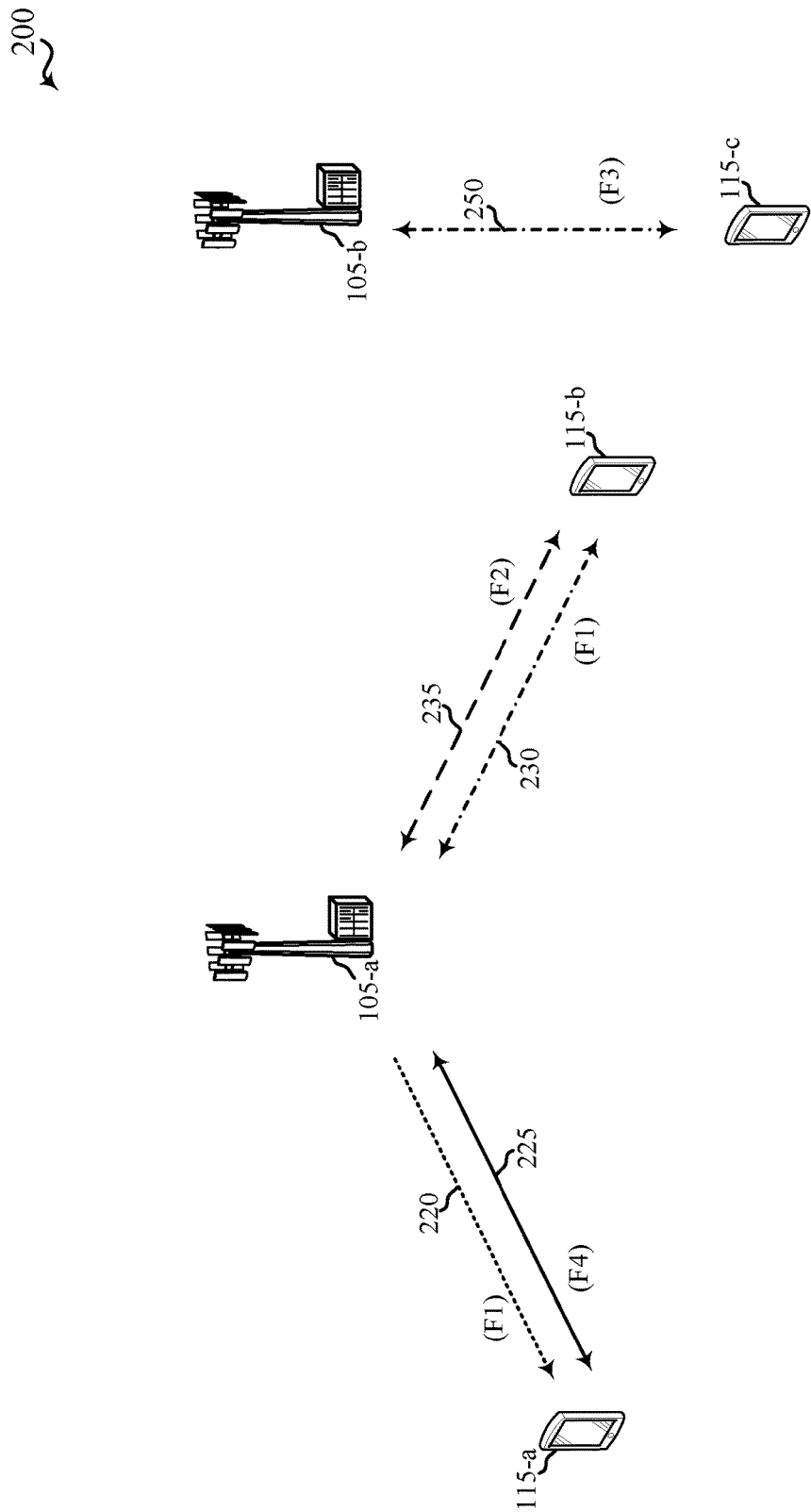
FIG. 2 shows a wireless communication system in which LTE/LTE-A may be deployed under different scenarios using a contention-based radio frequency spectrum band, in accordance with various aspects of the present disclosure.

FIG. 2 shows a wireless communication system 200 in which LTE/LTE-A may be deployed under different scenarios using a contention-based radio frequency spectrum band, in accordance with various aspects of the present disclosure. More specifically, FIG. 2 illustrates examples of a supplemental downlink mode (also referred to as a first licensed assisted access mode), a carrier aggregation mode (also referred to as a second licensed assisted access mode), and a standalone mode, in which LTE/LTE-A and/or eCC OFDM numerology is employed using a contention-based radio frequency spectrum band. The wireless communication system 200 may be an example of portions of the wireless communication system 100 described with reference to FIG. 1. Moreover, a first base station 105-*a* and a second base station 105-*b* may be examples of aspects of one or more of the base stations 105 described with reference to FIG. 1, while a first UE 115-*a*, a second UE 115-*b*, and a third UE 115-*c* may be examples of aspects of one or more of the UEs 115 described with reference to FIG. 1.

In the example of the supplemental downlink mode (e.g., the first licensed assisted access mode) in the wireless communication system 200, the first base station 105-*a* may transmit OFDMA waveforms to the first UE 115-*a* using a downlink channel 220. The downlink channel 220 may be associated with a frequency F1 in a contention-based radio frequency spectrum band. The first base station 105-*a* may transmit OFDMA waveforms to the first UE 115-*a* using a first bidirectional link 225 and may receive SC-FDMA waveforms from the first UE 115-*a* using the first bidirectional link 225. The first bidirectional link 225 may be associated with a frequency F4 in a contention-free radio frequency spectrum band. The downlink channel 220 in the contention-based radio frequency spectrum band and the first bidirectional link 225 in the contention-free radio frequency spectrum band may operate contemporaneously. The downlink channel 220 may provide a downlink capacity offload for the first base station 105-*a*. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a contention-free radio frequency spectrum and needs to relieve some of the traffic or signaling congestion.

In the example of the carrier aggregation mode (e.g., the second licensed assisted access mode) in the wireless communication system 200, the first base station 105-*a* may transmit OFDMA waveforms to the second UE 115-*b* using a second bidirectional link 230 and may receive OFDMA waveforms, SC-FDMA waveforms, or resource block interleaved FDMA waveforms from the second UE 115-*b* using the second bidirectional link 230. The second bidirectional link 230 may be associated with the frequency F1 in the contention-based radio frequency spectrum band. The first base station 105-*a* may also transmit OFDMA waveforms to the second UE 115-*b* using a third bidirectional link 235 and may receive SC-FDMA waveforms from the second UE 115-*b* using the third bidirectional link 235. The third bidirectional link 235 may be associated with a frequency F2 in a contention-free radio frequency spectrum band. The second bidirectional link 230 may provide a downlink and uplink capacity offload for the first base station 105-*a*. Like the supplemental downlink mode (e.g., licensed assisted access mode) described above, this scenario may occur with any service provider (e.g., MNO) that uses a contention-free radio frequency spectrum and needs to relieve some of the traffic or signaling congestion.

As described above, one type of service provider that may benefit from the capacity offload offered by using LTE/LTE-A in a contention-based radio frequency spectrum band is a traditional MNO having access rights to an LTE/LTE-A contention-free radio frequency spectrum band. For these service providers, an operational example may include a bootstrapped mode (e.g., supplemental downlink, carrier aggregation) that uses the LTE/LTE-A primary component carrier (PCC) on the contention-free radio frequency spectrum band and at least one secondary component carrier (SCC) on the contention-based radio frequency spectrum band.

In the carrier aggregation mode, data and control may, for example, be communicated in the contention-free radio frequency spectrum band (e.g., via first bidirectional link 225 or third bidirectional link 235) while data may, for example, be communicated in the contention-based radio frequency spectrum band (e.g., via second bidirectional link 230). The carrier aggregation mechanisms supported when using a contention-based radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 105-*b* may transmit OFDMA waveforms to the third UE 115-*c* using a bidirectional link 250 and may receive OFDMA waveforms, SC-FDMA waveforms, or resource block interleaved FDMA waveforms from the fourth UE 115-*c* using the bidirectional link 250. The bidirectional link 250 may be associated with the frequency F3 in the contention-based radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a contention-free radio frequency spectrum band.

In some examples, a transmitting apparatus such as one of the base stations 105 described with reference to FIGS. 1 and 2, or one of the UEs 115 described with reference to FIGS. 1 and 2, may use a gating interval to gain access to a channel of a contention-based radio frequency spectrum band (e.g., to a physical channel of the contention-based radio frequency spectrum band). In some examples, the gating interval may be synchronous and periodic. For example, the periodic gating interval may be synchronized with at least one boundary of an LTE/LTE-A radio interval. In other examples, the gating interval may be asynchronous. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a CCA procedure or an eCCA procedure. The outcome of the CCA procedure or eCCA procedure may indicate to the transmitting apparatus whether a channel of a contention-based radio frequency spectrum band is available or in use for the gating interval (e.g., an LBT radio frame or transmission burst). When a CCA procedure or eCCA procedure indicates the channel is available for a corresponding LBT radio frame or transmission burst (e.g., "clear" for use), the transmitting apparatus may reserve or use the channel of the contention-based radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
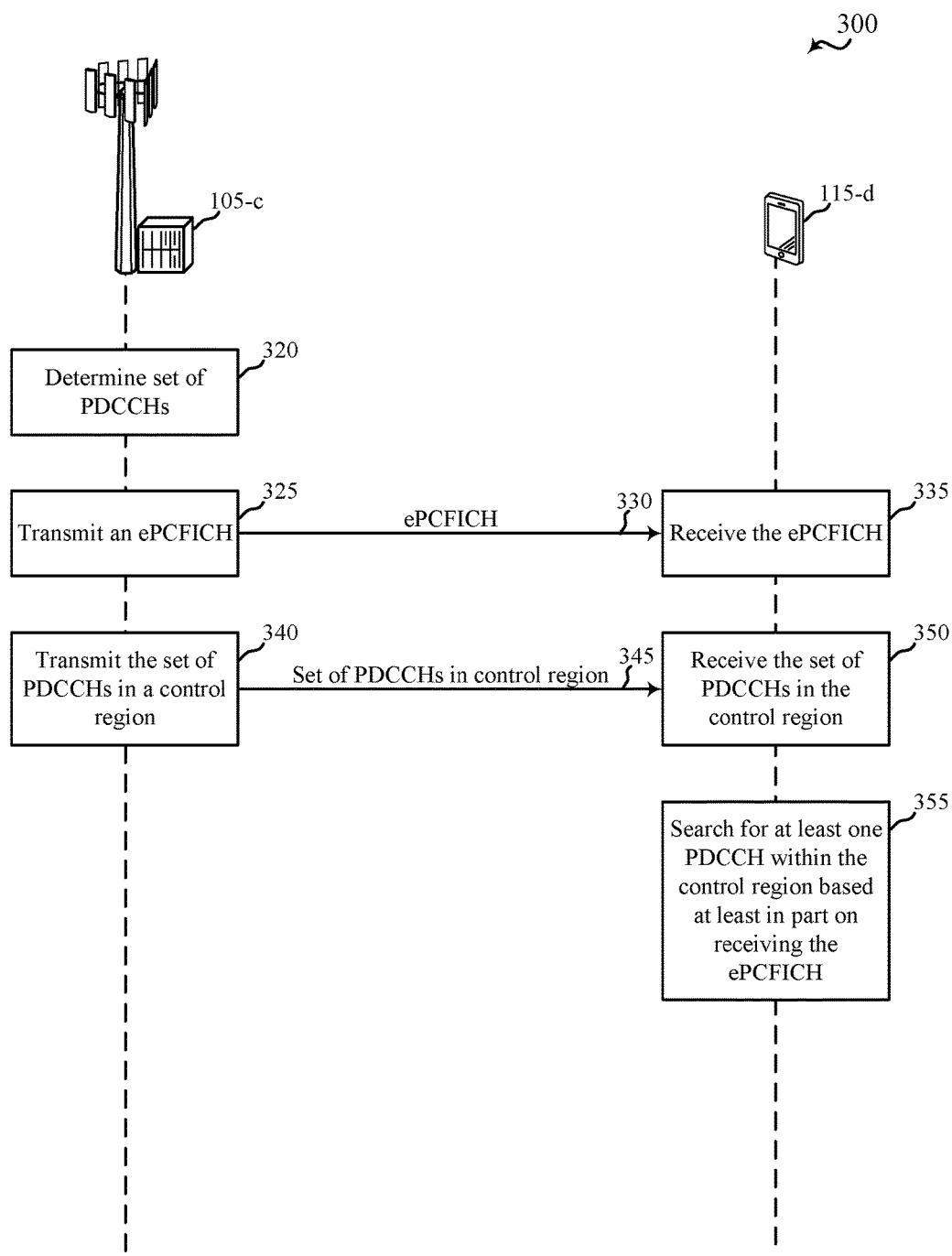
FIG. 3 shows a message flow between devices of a wireless communication system, in accordance with various aspects of the present disclosure.

FIG. 3 shows a message flow between devices of a wireless communication system 300, in accordance with various aspects of the present disclosure. By way of example, the wireless communication system 300 includes a base station 105-*c* and a UE 115-*d*. The base stations 105-*c* and UE 115-*d* may be examples of aspects of the base stations 105 and UEs 115 described with reference to FIGS. 1 and 2. In some examples, the base station 105-*c* and UE 115-*d* may communicate over a contention-free radio frequency spectrum band, a contention-based radio frequency spectrum band, and/or an eCC. The contention-free radio frequency spectrum band may include a radio frequency spectrum band for which transmitting devices may not contend for access because the radio frequency spectrum band is licensed to particular users for particular uses (e.g., a licensed radio frequency spectrum band usable for LTE/LTE-A communications). The contention-based radio frequency spectrum band may include a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner).

At 320, the base station 105-*c* may determine a set of PDCCHs to be transmitted in a control region 345.

At 325, the base station 105-*c* may transmit an ePCFICH 330 identifying a quantity of PDCCHs in the set of PDCCHs associated with each aggregation level of the at least one aggregation level (e.g., a quantity of x PDCCHs associated with an aggregation level of 1, a quantity of y PDCCHs associated with an aggregation level of 2, etc.), and a size of the control region 345. At 335, the UE 115-*d* may receive (e.g., process) the ePCFICH 330.

At 340, the base station 105-*c* may transmit the set of PDCCHs in the control region 345 on a component carrier deployed in a radio frequency spectrum band. At 350, the UE 115-*d* may receive the control region 345.

At 355, the UE 115-*d* may search for at least one PDCCH within the control region 345 based at least in part on receiving the ePCFICH 330 at 335.

Figure 4:
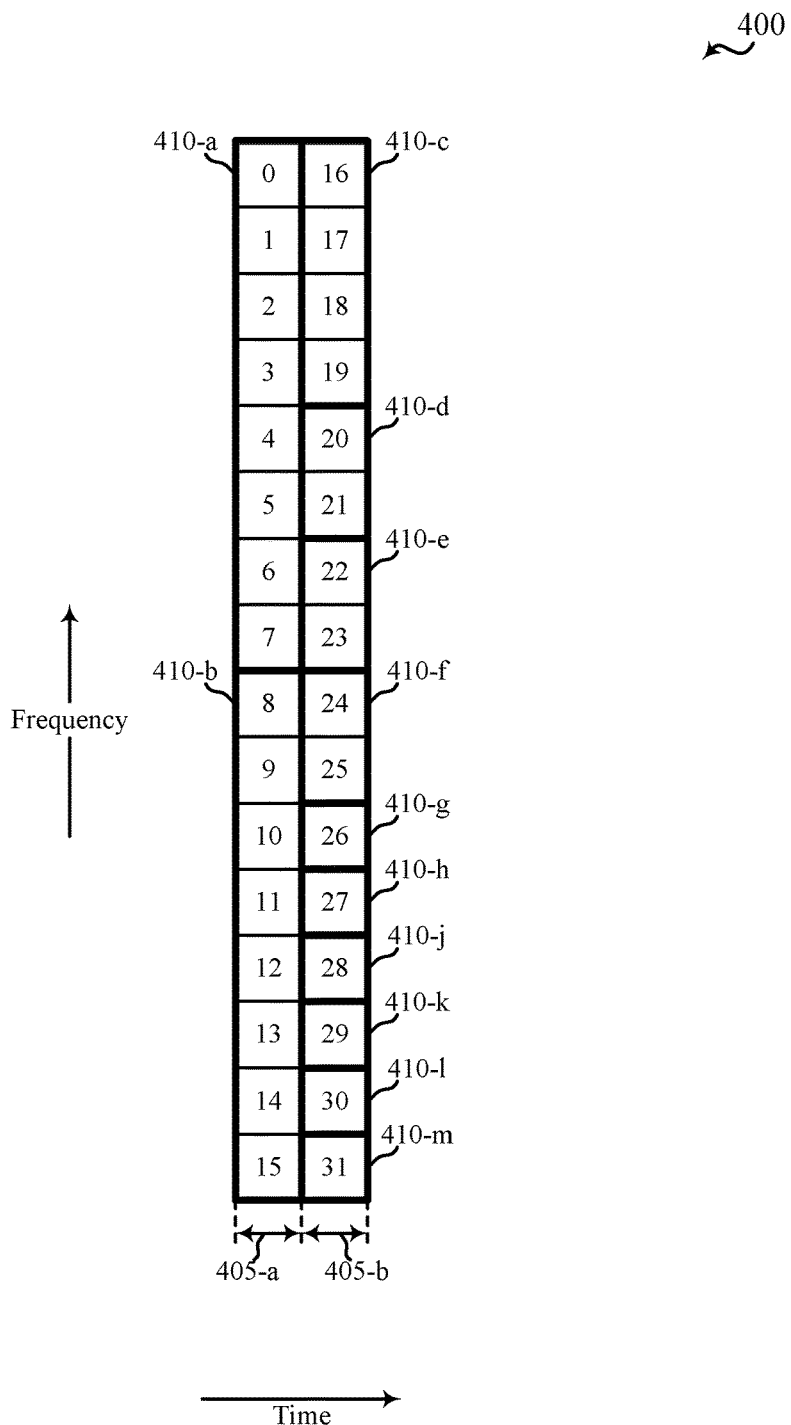
FIG. 4 shows a time/frequency representation of a control region, in accordance with various aspects of the present disclosure.

FIG. 4 shows a time/frequency representation of a control region 400, in accordance with various aspects of the present disclosure. By way of example, the control region 400 may be transmitted by one of the base stations 105 described with reference to FIGS. 1-3, and received by one or more of the UEs 115 described with reference to FIGS. 1-3.

By way of example, the control region 400 may include thirty-two CCEs, identified by CCE indices 0-31. As shown, a different set of sixteen of the thirty-two CCEs may be transmitted in each of a first symbol period 405-*a* and a second symbol period 405-*b*. Assuming the control region 400 is transmitted for an eCC having a bandwidth of 80 MHz, and by way of further example, four CCEs per symbol period may be allocated to each 20 MHz segment of the eCC, for a total allocation (over the first symbol period 405-*a* and the second symbol period 405-*b*) of eight CCEs per segment.

By way of further example, the control region 400 is formatted to carry twelve PDCCHs (e.g., a first PDCCH 410-*a*, a second PDCCH 410-*b*, a third PDCCH 410-*c*, a fourth PDCCH 410-*d*, a fifth PDCCH 410-*e*, a sixth PDCCH 410-*f*, a seventh PDCCH 410-*g*, an eighth PDCCH 410-*h*, a ninth PDCCH 410-*j*, a tenth PDCCH 410-*k*, an eleventh PDCCH 410-*l*, and a twelfth PDCCH 410-*m*). A PDCCH associated with an aggregation level of 1 may be transmitted on one of the CCEs (e.g., the seventh PDCCH 410-*g* may be transmitted on CCE 26). A PDCCH associated with an aggregation level of 2 may be transmitted on two of the CCEs (e.g., the fourth PDCCH 410-*d* may be transmitted on CCE 20 and CCE 21). A PDCCH associated with an aggregation level of 4 may be transmitted on four of the CCEs (e.g., the third PDCCH 410-*c* may be transmitted on CCE 16, CCE 17, CCE 18, and CCE 19). A PDCCH associated with an aggregation level of 8 may be transmitted on eight of the CCEs (e.g., the first PDCCH 410-*a* may be transmitted on CCE 0, CCE 1, CCE 2, CCE 3, CCE 4, CCE 5, CCE 6, and CCE 7).

By way of further example, each of the first PDCCH 410-*a* and the second PDCCH 410-*b* is associated with an aggregation level of 8; the third PDCCH 410-*c* is associated with an aggregation level of 4; each of the fourth PDCCH 410-*d*, the fifth PDCCH 410-*e*, and the sixth PDCCH 410-*f* is associated with an aggregation level of 2; and each of the seventh PDCCH 410-*g*, the eighth PDCCH 410-*h*, the ninth PDCCH 410-*j*, the tenth PDCCH 410-*k*, the eleventh PDCCH 410-*l*, and the twelfth PDCCH 410-*m* is associated with an aggregation level of 1. This configuration of PDCCHs may be represented as {8, 8, 4, 2, 2, 2, 1, 1, 1, 1, 1, 1}. Alternative formats of the control region 400 may range from a {8, 8, 8, 8} configuration (e.g., a configuration including four PDCCHs, in which each PDCCH is associated with an aggregation level of 8) to a {1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1} configuration (e.g., a configuration including thirty-two PDCCHs, in which each PDCCH is associated with an aggregation level of 1). In some examples, the control region 400 may be associated with a stipulation that PDCCHs be transmitted in order of aggregation level (e.g., with PDCCHs associated with an aggregation level of 8 (if any) transmitted first, starting with a lowest available CCE index (e.g., CCE 0) in a lowest order available symbol period (e.g., the first symbol period 405-*a*) of the control region 400; with PDCCHs associated with an aggregation level of 4 (if any) transmitted second, starting with a lowest available CCE index in a lowest order available symbol period; with PDCCHs associated with an aggregation level of 2 (if any) transmitted third, starting with a lowest available CCE index in a lowest order available symbol period; and with PDCCHs associated with an aggregation level of 1 (if any) transmitted fourth, starting with a lowest available CCE index in a lowest order available symbol period).

In some examples, an ePCFICH may be transmitted by the base station transmitting the control region 400. The ePCFICH may convey the size and format of the control region 400. In some examples, the ePCFICH may convey the size and format of the control region 400 by identifying a quantity of PDCCHs (in the control region 400) associated with each aggregation level of at least one aggregation level, and a size of the control region 400. For example, in the context of FIG. 4, the ePCFICH may indicate that two PDCCHs in the control region 400 are associated with an aggregation level of 8, that one PDCCH is associated with an aggregation level of 4, that three PDCCHs are associated with an aggregation level of 2, that six PDCCHs are associated with an aggregation level of 1, and that the size of the control region 400 is two symbol periods. In some examples, the quantity of PDCCHs associated with each aggregation level and the size of the control region 400 may be jointly coded such that, for example, the quantity of PDCCHs associated with each aggregation level may imply the size of the control region 400. A UE device that receives and decodes the ePCFICH may determine, from the ePCFICH, that the control region 400 includes twelve PDCCHs. The UE device may also determine, from the ePCFICH, the starting locations (in time and frequency) of the twelve PDCCHs, the aggregation levels of the twelve PDCCHs, and the CCE indices associated with each of the twelve PDCCHs. Thus, the UE device may search for PDCCHs targeted to the UE device by performing twelve blind decodes (corresponding to the starting CCE locations of the twelve PDCCHs) instead of 117 blind decodes (corresponding to each CCE starting location and aggregation level, that is, each CCE starting location 0-30 within the control region 400 for an aggregation level of 2, each CCE starting location 0-28 within the control region 400 for an aggregation level of 4, and each CCE starting location 0-24 within the control region 400 for an aggregation level of 8). Such a reduction in the number of blind decodes performed by a UE device can reduce latency and power consumption, and also reduce the likelihood of false positive decodes (e.g., the likelihood that a PDCCH intended to a different UE or a non-existing PDCCH is falsely identified, as a result of a decoding error).

In some examples, the ePCFICH may identify a quantity of PDCCHs associated with the aggregation level of 1 by identifying a plurality of modulation orders associated with the quantity of PDCCHs, and identifying a plurality of sub-quantities of the quantity of PDCCHs associated with each modulation order of the plurality of modulation orders. For example, the ePCFICH may identify a first sub-quantity of x PDCCHs associated with a 16 quadrature amplitude modulation (16QAM) modulation order, a second sub-quantity of y PDCCHs associated with a quadrature phase shift keying (QPSK) modulation order, etc. The transmit power associated with each modulation order may be a fixed value or may be signaled. A transmit power may be signaled, for example, via UE-specific higher layer signaling, or via a cell-specific signaling configuration.

In some examples, the base station transmitting the control region 400 may perform PDCCH scheduling without limiting the PDCCH search space of one or more UE devices (or any UE device), thereby simplifying PDCCH scheduling. In other examples, the base station may restrict one or more UE devices to searching for PDCCHs associated with a subset of a plurality of aggregation levels, or to searching for PDCCHs within a restricted search space of the control region 400. A search restriction may further reduce the number of blind decodes performed by a UE device.

In some examples, a base station that transmits the control region 400 may use a same aggregation level for each PDCCH targeted to a single UE device. For example, a same aggregation level may be used for a first PDCCH corresponding to a downlink grant for a UE device and a second PDCCH corresponding to an uplink grant for the UE device.

Figure 5:
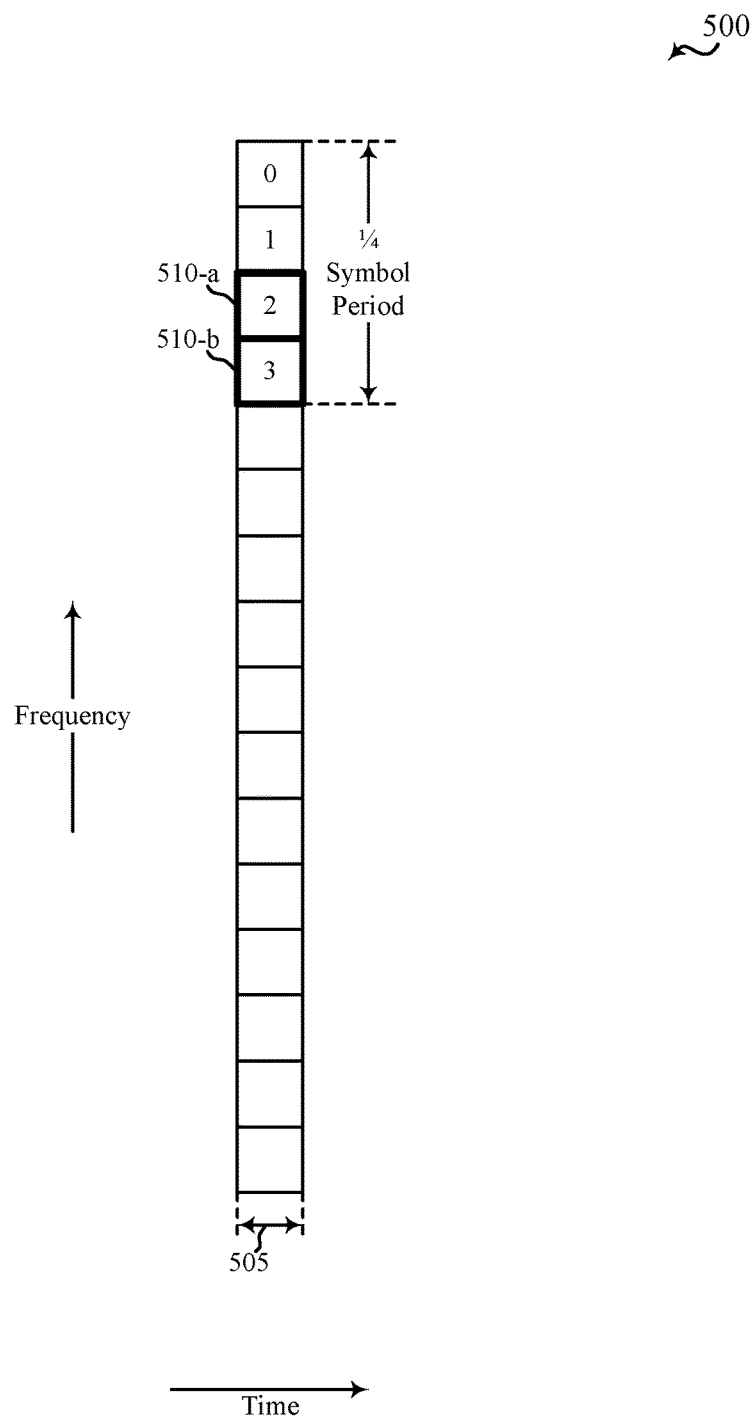
FIG. 5 shows a time/frequency representation of a control region, in accordance with various aspects of the present disclosure.

FIG. 5 shows a time/frequency representation of a control region 500, in accordance with various aspects of the present disclosure. By way of example, the control region 500 may be transmitted by one of the base stations 105 described with reference to FIGS. 1-3, and received by one or more of the UEs 115 described with reference to FIGS. 1-3.

By way of example, the control region 500 may include four CCEs, identified by CCE indices 0-3. As shown, the four CCEs may be transmitted within a fraction (e.g., ¼) of a symbol period 505. Assuming the control region 500 is transmitted for an eCC having a bandwidth of 80 MHz, and by way of further example, one CCE may be allocated to each 20 MHz segment of the eCC.

By way of further example, the control region 500 is formatted to reserve two CCEs (e.g., CCE 0 and CCE 1) for other control channels (e.g., an ePCFICH, etc.), leaving just two CCEs (e.g., CCE 2 and CCE 3) for the transmission of PDCCHs. As shown, CCE 2 and CCE 3 are formatted to carry a first PDCCH 510-*a* and a second PDCCH 510-*b*, respectively, with each of the first PDCCH 510-*a* and the second PDCCH 510-*b* being associated with an aggregation level of 1. This configuration of PDCCHs may be represented as {1, 1}. Alternatively, the CCE 2 and CCE 3 may be formatted to carry a single PDCCH associated with an aggregation level of 2 (e.g., a {2} configuration).

In some examples, an ePCFICH may be transmitted by the base station transmitting the control region 500. The ePCFICH may convey the size and format of the control region 500. In some examples, the ePCFICH may convey the size and format of the control region 500 by identifying a quantity of PDCCHs (in the control region 500) associated with each aggregation level of at least one aggregation level, and a size of the control region 500. For example, in the context of FIG. 5, the ePCFICH may indicate that two PDCCHs in the control region 500 are associated with an aggregation level of 1, and that the size of the control region 500 is ¼ of a symbol period. In some examples, the ePCFICH may explicitly (or implicitly) indicated that no PDCCH is associated with an aggregation level of 2, 4, or 8. In some examples, the quantity of PDCCHs associated with each aggregation level and the size of the control region 500 may be jointly coded such that, for example, the quantity of PDCCHs associated with each aggregation level may imply the size of the control region 500. A UE device that receives and decodes the ePCFICH may determine, from the ePCFICH, that the control region 500 includes two PDCCHs. The UE device may also determine, from the ePCFICH, the starting locations (in time and frequency) of the two PDCCHs, and the PDCCH and aggregation level associated with each of CCE 2 and CCE 3. Thus, the UE device may search for PDCCHs targeted to the UE device by performing two blind decodes (corresponding to the starting CCE locations of the two PDCCHs).

Because the control region 500 can be transmitted in a fraction of a symbol period, some or all of the resource elements in the remaining fraction of the symbol period may be used to transmit at least a portion of a PDSCH (or other data or control channel). A transmit power (e.g., an energy per resource element) used for the resource elements of a portion of a PDSCH transmitted in the remaining fraction of the symbol period may be the same or different from a transmit power used for a portion of the PDSCH transmitted a non-fractional symbol period. When the transmit powers differ, the transmit power used for the resource elements of the portion of the PDSCH transmitted in the remaining fraction of the symbol period may be signaled to one or more UE devices. In some examples, the transmit power may be signaled in one of the PDCCHs transmitted in the control region 500.

In some examples, the transmit power of at least one PDCCH transmitted in the control region 500 may be boosted based at least in part on the control region 500 occupying a fraction of a symbol period (e.g., transmit power may be borrowed from unoccupied CCEs).

Assuming that a control region (e.g., the control region 400 or 500 described with reference to FIG. 4 or 5) is transmitted for an eCC having an 80 MHz bandwidth, that the control region may have as many as thirty-two CCEs (e.g., sixteen CCEs in each of two symbol periods), that a maximum of sixteen PDCCHs may be transmitted in the control region, that a PDCCH may be associated with an aggregation level of 1, 2, 4, or 8, and that two CCEs in the control region are reserved, a 7-bit ePCFICH may be used to encode the following 122 control region scenarios:

Control region size: 2 CCEs (¼ symbol period), 6 CCEs (½ symbol period), 14 CCEs (1 symbol period), or 30 CCEs (2 symbol periods)

For a control region size of 2 CCEs: a control region format including a PDCCH configuration of {1, 1} or {2}

For a control region size of 6 CCEs: a control region format including a PDCCH configuration of {1, 1, 1, 1, 1, 1}, {2, 1, 1, 1, 1}, {2, 2, 1, 1}, {2, 2, 2}, {4, 1, 1}, or {4, 2}

Figure 6:
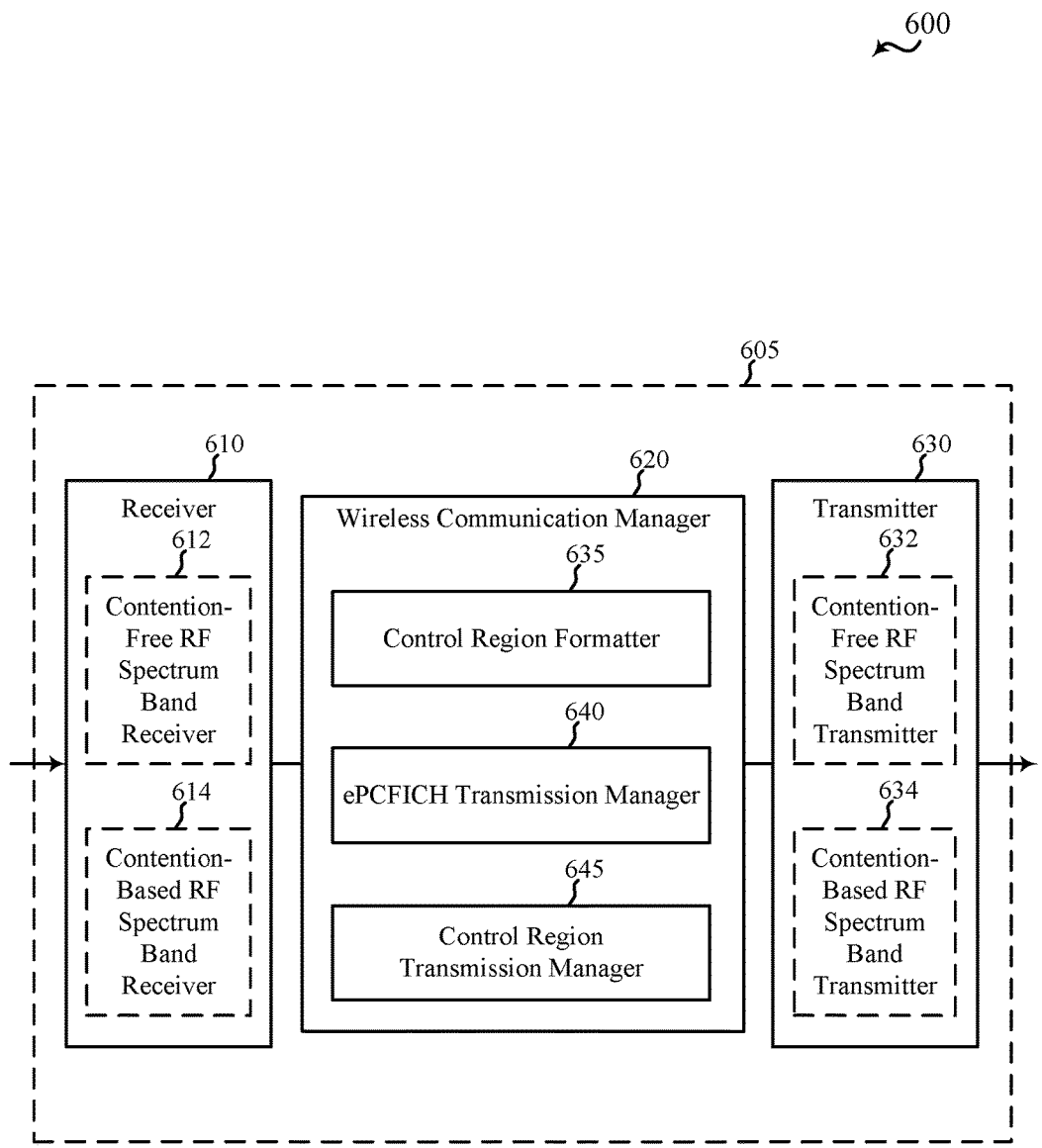
FIG. 6 shows a diagram of a device for use in wireless communication at a base station, in accordance with various aspects of the present disclosure.

For a control region size of 14 CCEs: a control region format including one of 26 different PDCCH configurations For a control region size of 30 CCEs: a control region format including one of 88 different PDCCH configurations FIG. 6 shows a diagram 600 of a device 605 for use in wireless communication at a base station, in accordance with various aspects of the present disclosure. The device 605 may be an example of aspects of one or more of the base stations 105 described with reference to FIGS. 1-3. The device 605 may also be or include a processor. The device 605 may include a receiver 610, a wireless communication manager 620, or a transmitter 630. Each of these components may be in communication with each other.

The components of the device 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, Field Programmable Gate Arrays (FPGAs), a System on Chip (SoC), and/or others of Semi-Custom ICs), which may be programmed in any manner known in the art. The functions of each module may also be implemented, in whole or in part, with instructions embodied in a memory, formatted to be executed by one or more general or application-specific processors.

In some examples, the receiver 610 may include at least one radio frequency (RF) receiver, such as at least one RF receiver operable to receive transmissions over a contention-free radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a contention-based radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)). In some examples, the contention-free radio frequency spectrum band or the contention-based radio frequency spectrum band may be used for LTE/LTE-A communications, as described, for example, with reference to FIGS. 1 and 2. The receiver 610 may in some cases include separate receivers for the contention-free radio frequency spectrum band and the contention-based radio frequency spectrum band. The separate receivers may, in some examples, take the form of contention-free RF spectrum band receiver 612 for communicating over the contention-free radio frequency spectrum band, and a contention-based RF spectrum band receiver 614 for communicating over the contention-based radio frequency spectrum band. The receiver 610, including the contention-free RF spectrum band receiver 612 or the contention-based RF spectrum band receiver 614, may be used to receive various data or control signals (e.g., as transmissions) over one or more communication links of a wireless communication system, such as one or more communication links of the wireless communication system 100 or 200 described with reference to FIGS. 1 and 2. The communication links may be established over the contention-free radio frequency spectrum band or the contention-based radio frequency spectrum band.

In some examples, the transmitter 630 may include at least one RF transmitter, such as at least one RF transmitter operable to transmit over the contention-free radio frequency spectrum band or the contention-based radio frequency spectrum band. The transmitter 630 may in some cases include separate transmitters for the contention-free radio frequency spectrum band and the contention-based radio frequency spectrum band. The separate transmitters may, in some examples, take the form of a contention-free RF spectrum band transmitter 632 for communicating over the contention-free radio frequency spectrum band, and a contention-based RF spectrum band transmitter 634 for communicating over the contention-based radio frequency spectrum band. The transmitter 630, including the contention-free RF spectrum band transmitter 632 or the contention-based RF spectrum band transmitter 634, may be used to transmit various data or control signals (e.g., as transmissions) over one or more communication links of a wireless communication system, such as one or more communication links of the wireless communication system 100, 200, or 300 described with reference to FIGS. 1-3. The communication links may be established over the contention-free radio frequency spectrum band or the contention-based radio frequency spectrum band.

In some examples, the wireless communication manager 620 may be used to manage one or more aspects of wireless communication for the device 605. In some examples, the wireless communication manager 620 may include a control region formatter 635, an ePCFICH transmission manager 640, or a control region transmission manager 645.

The control region formatter 635 may be used to determine a set of PDCCHs to be transmitted in a control region. In some examples, determining the set of PDCCHs to be transmitted in the control region may include formatting a subset of PDCCHs for a single UE device using a same aggregation level (e.g., all of the PDCCHs to be transmitted to a single UE device may be formatted using a same aggregation level).

The ePCFICH transmission manager 640 may be used to transmit an ePCFICH identifying a quantity of PDCCHs in the set of PDCCHs associated with each aggregation level of at least one aggregation level, and a size of the control region. In some examples, the at least one aggregation level may include a plurality of aggregation levels. In some examples, the ePCFICH may identify a first quantity of PDCCHs in the set of PDCCHs associated with a first aggregation level of the at least one aggregation level (or a second quantity of the PDCCHs associated with a second aggregation level, etc.) by identifying a plurality of modulation orders associated with the first quantity of PDCCHs, and a plurality of sub-quantities of the first quantity of PDCCHs associated with each modulation order of the plurality of modulation orders.

The control region transmission manager 645 may be used to transmit the set of PDCCHs in the control region on a component carrier deployed in a radio frequency spectrum band. In some examples, the PDCCHs may be transmitted in the control region in a predetermined order based at least in part on the plurality of aggregation levels. In some examples, the component carrier may include an eCC.

Figure 7:
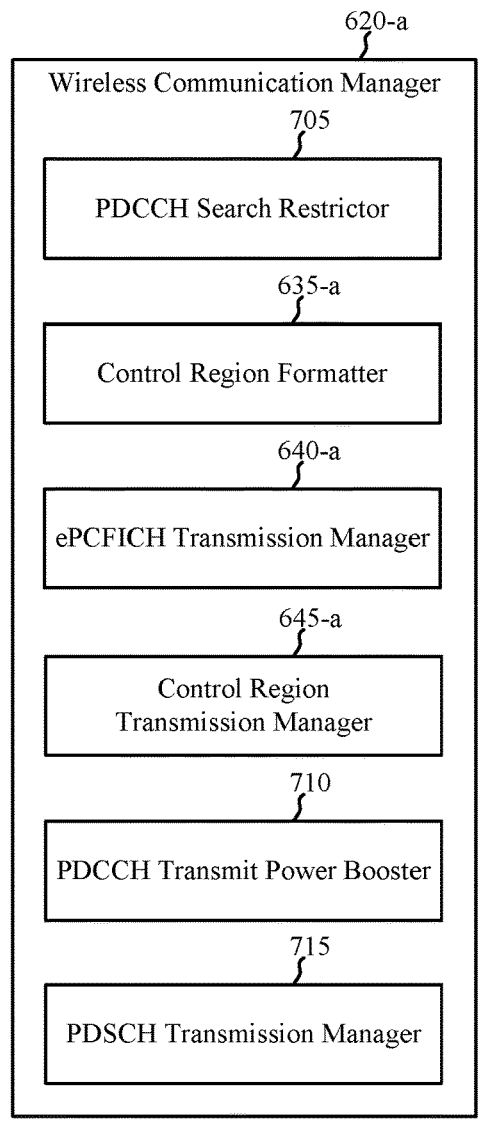
FIG. 7 shows a diagram of a wireless communication manager, in accordance with various aspects of the present disclosure.

FIG. 7 shows a diagram 700 of a wireless communication manager 620-a, in accordance with various aspects of the present disclosure. The wireless communication manager 620-a may be an alternative to the wireless communication manager 620 described with reference to FIG. 6, or may be provided in one or more of the base stations 105 described with reference to FIGS. 1-3. The wireless communication manager 620-a may be used to manage one or more aspects of wireless communication for a base station. In some examples, part of the wireless communication manager 620-a may be incorporated into or shared with a receiver or a transmitter of a device, such as the receiver 610 or the transmitter 630 of the device 605 described with reference to FIG. 6. In some examples, the wireless communication manager 620-a may include a control region formatter 635-a, an ePCFICH transmission manager 640-a, or a control region transmission manager 645-a, which may be examples of the control region formatter 635, the ePCFICH transmission manager 640, or the control region transmission manager 645 described with reference to FIG. 6. The wireless communication manager 620-a may also include a PDCCH search restrictor 705, a PDCCH transmit power booster 710, or a PDSCH transmission manager 715.

The components of the wireless communication manager 620-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

The PDCCH search restrictor 705 may optionally be used to restrict a UE device to searching for PDCCHs associated with a subset of a plurality of aggregation levels, or to searching for PDCCHs within a restricted search space of a control region. In some examples, the restricting may include signaling a search restriction to the UE device. In some examples, the same or different search restrictions may be signaled to different UE devices.

The control region formatter 635-a may be used to determine a set of PDCCHs to be transmitted in the control region. In some examples, determining the set of PDCCHs to be transmitted in the control region may include formatting a subset of PDCCHs for a single UE device using a same aggregation level (e.g., all of the PDCCHs to be transmitted to a single UE device may be formatted using a same aggregation level).

The ePCFICH transmission manager 640-a may be used to transmit an ePCFICH identifying a quantity of PDCCHs in the set of PDCCHs associated with each aggregation level of at least one aggregation level, and a size of the control region. In some examples, the at least one aggregation level may include more than one or all of the plurality of aggregation levels. In some examples, the ePCFICH may identify a first quantity of PDCCHs in the set of PDCCHs associated with a first aggregation level of the at least one aggregation level (or a second quantity of the PDCCHs associated with a second aggregation level, etc.) by identifying a plurality of modulation orders associated with the first quantity of PDCCHs, and a plurality of sub-quantities of the first quantity of PDCCHs associated with each modulation order of the plurality of modulation orders.

The control region transmission manager 645-a may be used to transmit the set of PDCCHs in the control region on a component carrier deployed in a radio frequency spectrum band. In some examples, the PDCCHs may be transmitted in the control region in a predetermined order based at least in part on the plurality of aggregation levels. In some examples, the component carrier may include an eCC.

In some examples, the control region in which the set of PDCCHs is transmitted may occupy a first fraction of a symbol period (e.g., less than all of the symbol period). In these examples, and based at least in part on the control region occupying the first fraction of the symbol period, the PDCCH transmit power booster 710 may optionally be used to boost the transmit power of at least one of the PDCCHs transmitted in the control region.

The PDSCH transmission manager 715 may be used to transmit a PDSCH. When the control region in which the set of PDCCHs is transmitted occupies a first fraction of a symbol period, the PDSCH transmission manager 715 may transmit at least a portion of the PDSCH in a second fraction of the symbol period.

Figure 8:
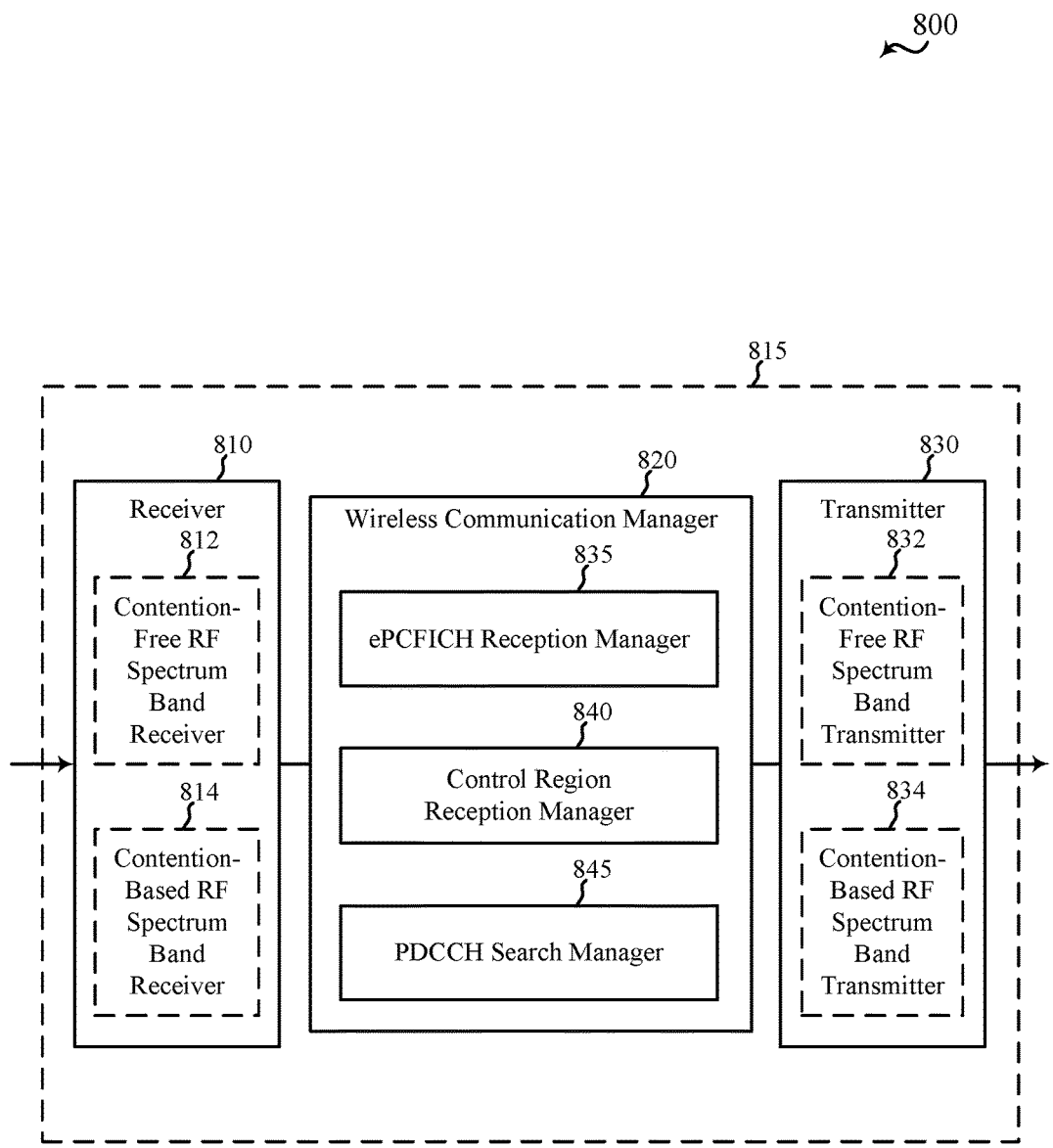
FIG. 8 shows a diagram of a device for use in wireless communication at a UE device, in accordance with various aspects of the present disclosure.

FIG. 8 shows a diagram 800 of a device 815 for use in wireless communication at a UE device, in accordance with various aspects of the present disclosure. The device 815 may be an example of aspects of one or more of the UEs 115 described with reference to FIGS. 1-3. The device 815 may also be or include a processor. The device 815 may include a receiver 810, a wireless communication manager 820, or a transmitter 830. Each of these components may be in communication with each other.

The components of the device 815 may, individually or collectively, be implemented using one or more ASICs adapted to perform some or all of the applicable functions in hardware. Alternatively, the functions may be performed by one or more other processing units (or cores), on one or more integrated circuits. In other examples, others of integrated circuits may be used (e.g., Structured/Platform ASICs, FPGAs, a SoC, and/or others of Semi-Custom ICs), which may be programmed in any manner known in the art. The functions of each module may also be implemented, in whole or in part, with instructions embodied in a memory, formatted to be executed by one or more general or application-specific processors.

In some examples, the receiver 810 may include at least one RF receiver, such as at least one RF receiver operable to receive transmissions over a contention-free radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a contention-based radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)). In some examples, the contention-free radio frequency spectrum band or the contention-based radio frequency spectrum band may be used for LTE/LTE-A communications, as described, for example, with reference to FIGS. 1 and 2. The receiver 810 may in some cases include separate receivers for the contention-free radio frequency spectrum band and the contention-based radio frequency spectrum band. The separate receivers may, in some examples, take the form of contention-free RF spectrum band receiver 812 for communicating over the contention-free radio frequency spectrum band, and a contention-based RF spectrum band receiver 814 for communicating over the contention-based radio frequency spectrum band. The receiver 810, including the contention-free RF spectrum band receiver 812 or the contention-based RF spectrum band receiver 814, may be used to receive various data or control signals (e.g., as transmissions) over one or more communication links of a wireless communication system, such as one or more communication links of the wireless communication system 100, 200, or 300 described with reference to FIGS. 1-3. The communication links may be established over the contention-free radio frequency spectrum band or the contention-based radio frequency spectrum band.

In some examples, the transmitter 830 may include at least one RF transmitter, such as at least one RF transmitter operable to transmit over the contention-free radio frequency spectrum band or the contention-based radio frequency spectrum band. The transmitter 830 may in some cases include separate transmitters for the contention-free radio frequency spectrum band and the contention-based radio frequency spectrum band. The separate transmitters may, in some examples, take the form of a contention-free RF spectrum band transmitter 832 for communicating over the contention-free radio frequency spectrum band, and a contention-based RF spectrum band transmitter 834 for communicating over the contention-based radio frequency spectrum band. The transmitter 830, including the contention-free RF spectrum band transmitter 832 or the contention-based RF spectrum band transmitter 834, may be used to transmit various data or control signals (e.g., as transmissions) over one or more communication links of a wireless communication system, such as one or more communication links of the wireless communication system 100, 200, or 300 described with reference to FIGS. 1-3. The communication links may be established over the contention-free radio frequency spectrum band or the contention-based radio frequency spectrum band.

In some examples, the wireless communication manager 820 may be used to manage one or more aspects of wireless communication for the device 815. In some examples, the wireless communication manager 820 may include an ePCFICH reception manager 835, a control region reception manager 840, or a PDCCH search manager 845.

The ePCFICH reception manager 835 may be used to receive an ePCFICH identifying a quantity of PDCCHs associated with each aggregation level of at least one aggregation level, and a size of a control region including a set of PDCCHs. In some examples, the at least one aggregation level may include a plurality of aggregation levels. In some examples, the ePCFICH may identify a first quantity of PDCCHs in the set of PDCCHs associated with a first aggregation level of the at least one aggregation level (or a second quantity of the PDCCHs associated with a second aggregation level, etc.) by identifying a plurality of modulation orders associated with the first quantity of PDCCHs, and a plurality of sub-quantities of the first quantity of PDCCHs associated with each modulation order of the plurality of modulation orders.

The control region reception manager 840 may be used to receive the control region, including the set of PDCCHs, on a component carrier deployed in a radio frequency spectrum band. In some examples, the PDCCHs may be received in the control region in a predetermined order based at least in part on the plurality of aggregation levels. In some examples, the component carrier may include an eCC.

The PDCCH search manager 845 may be used to search for at least one PDCCH within the control region based at least in part on receiving the ePCFICH. In some examples, the searching may include searching for a plurality of PDCCHs having a same aggregation level (e.g., all of the PDCCHs targeted for a UE device performing the method 1500 may be formatted using a same aggregation level).

Figure 9:
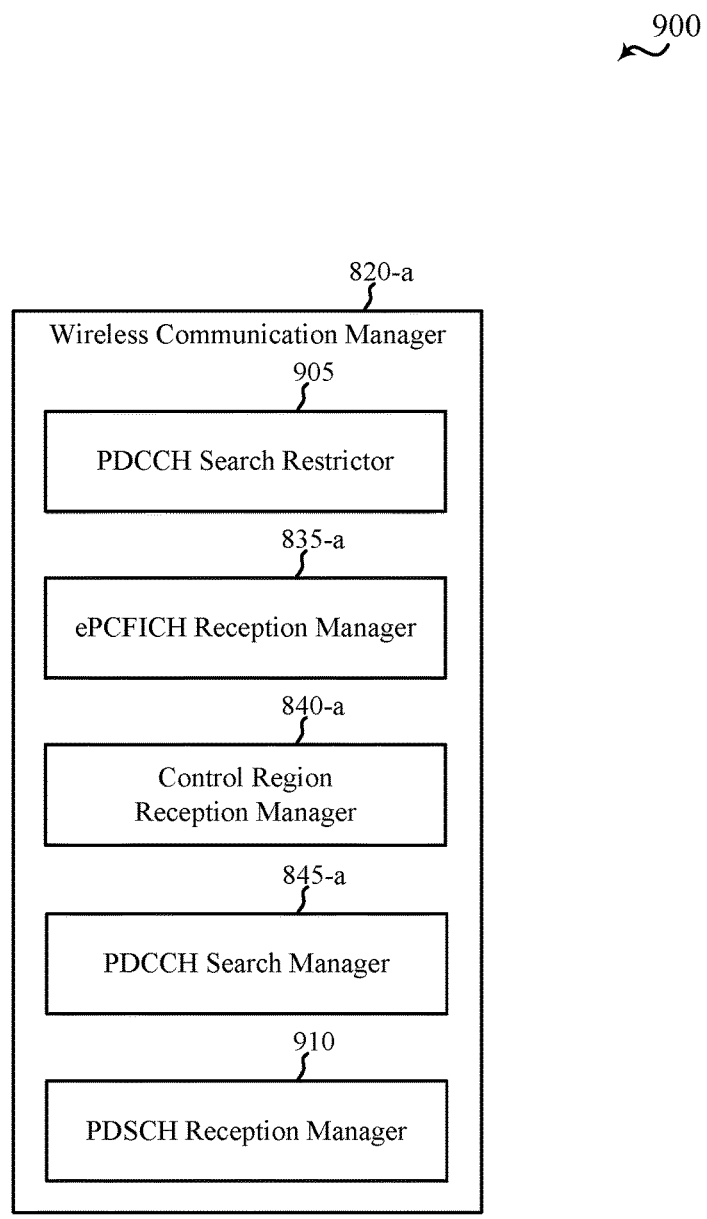
FIG. 9 shows a diagram of a wireless communication manager, in accordance with various aspects of the present disclosure.

FIG. 9 shows a diagram 900 of a wireless communication manager 820-*a*, in accordance with various aspects of the present disclosure. The wireless communication manager 820-*a* may be an alternative to the wireless communication manager 820 described with reference to FIG. 8, or may be provided in one or more of the UEs 115 described with reference to FIGS. 1-3. The wireless communication manager 820-*a* may be used to manage one or more aspects of wireless communication for a UE device. In some examples, part of the wireless communication manager 820-*a* may be incorporated into or shared with a receiver or a transmitter of a device, such as the receiver 810 or the transmitter 830 of the device 815 described with reference to FIG. 8. In some examples, the wireless communication manager 820-*a* may include an ePCFICH reception manager 835-*a*, a control region reception manager 840-*a*, or a PDCCH search manager 845-*a*, which may be examples of the ePCFICH reception manager 835, the control region reception manager 840, or the PDCCH search manager 845 described with reference to FIG. 8. The wireless communication manager 820-*a* may also include a PDCCH search restrictor 905 or a PDSCH reception manager 910.

The components of the wireless communication manager 820-*a* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

The PDCCH search restrictor 905 may optionally be used to receive a restriction to search for at least one PDCCH within a subset of PDCCHs associated with a subset of a plurality of aggregation levels, or to search for at least one PDCCH within a restricted search space of a control region. In some examples, a search restriction may be received in information signaled to a UE device including the wireless communication manager 820-*a*.

The ePCFICH reception manager 835-*a* may be used to receive an ePCFICH identifying a quantity of PDCCHs associated with each aggregation level of at least one aggregation level, and a size of a control region including a set of PDCCHs. In some examples, the at least one aggregation level may include a plurality of aggregation levels. In some examples, the ePCFICH may identify a first quantity of PDCCHs in the set of PDCCHs associated with a first aggregation level of the at least one aggregation level (or a second quantity of the PDCCHs associated with a second aggregation level, etc.) by identifying a plurality of modulation orders associated with the first quantity of PDCCHs, and a plurality of sub-quantities of the first quantity of PDCCHs associated with each modulation order of the plurality of modulation orders.

The control region reception manager 840-*a* may be used to receive the control region, including the set of PDCCHs, on a component carrier deployed in a radio frequency spectrum band. In some examples, the PDCCHs may be received in the control region in a predetermined order based at least in part on the plurality of aggregation levels. In some examples, the component carrier may include an eCC.

In some examples, the control region in which the set of PDCCHs is received may occupy a first fraction of a symbol period (e.g., less than all of the symbol period). In these examples, and based at least in part on the control region occupying the first fraction of the symbol period, at least one of the PDCCHs transmitted in the control region may be received at a boosted transmit power.

The PDCCH search manager 845-*a* may be used to search for the at least one PDCCH within the control region based at least in part on receiving the ePCFICH, and optionally based at least in part on any search restriction(s) received by the PDCCH search restrictor 905. In some examples, the searching may include searching for a plurality of PDCCHs having a same aggregation level (e.g., all of the PDCCHs targeted for a UE device including the wireless communication manager 820-*a* may be formatted using a same aggregation level).

The PDSCH reception manager 910 may be used to receive a PDSCH. When the control region in which the set of PDCCHs is received occupies a first fraction of a symbol period, the PDSCH reception manager 910 may receive at least a portion of the PDSCH in a second fraction of the symbol period.

Figure 10:
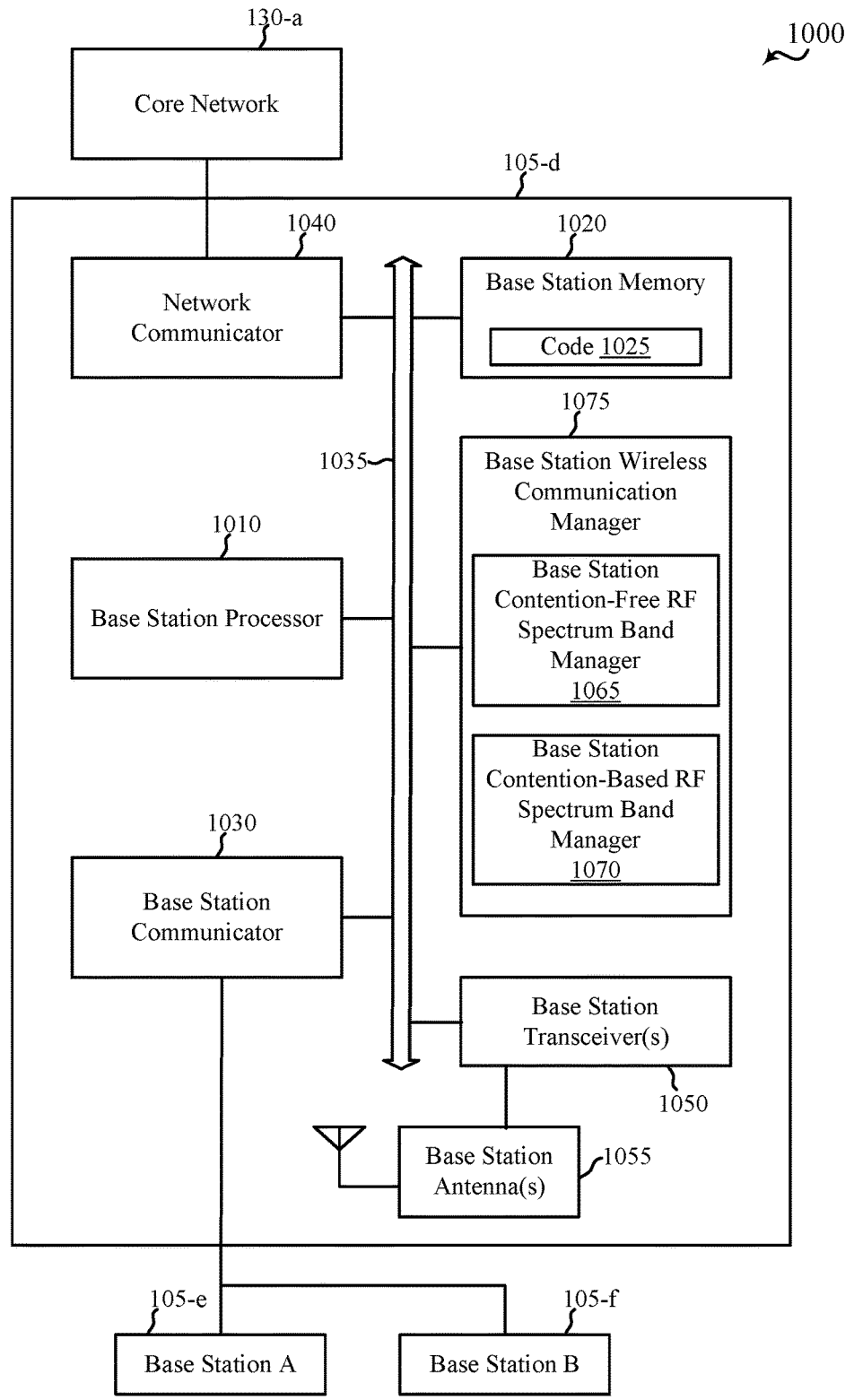
FIG. 10 shows a diagram of a base station (e.g., a base station forming part or all of an eNB) for use in wireless communication, in accordance with various aspects of the present disclosure.

FIG. 10 shows a diagram 1000 of a base station 105-*d* (e.g., a base station forming part or all of an eNB) for use in wireless communication, in accordance with various aspects of the present disclosure. In some examples, the base station 105-*d* may be an example of aspects of one or more of the base stations 105 described with reference to FIGS. 1-3. The base station 105-*d* may be configured to implement or facilitate at least some of the base station features and functions described with reference to FIGS. 1-7.

The base station 105-*d* may include a base station processor 1010, a base station memory 1020, at least one base station transceiver (represented by base station transceiver(s) 1050), at least one base station antenna (represented by base station antenna(s) 1055), or a base station wireless communication manager 1075, which may be an example of wireless communication manager 620 as described with reference to FIGS. 6 and 7. The base station 105-*d* may also include one or more of a base station communicator 1030 or a network communicator 1040. Each of these components may be in communication with each other, directly or indirectly, over one or more buses 1035.

The base station memory 1020 may include random access memory (RAM) or read-only memory (ROM). The base station memory 1020 may store computer-readable, computer-executable code 1025 containing instructions executable by the base station processor 1010 to perform various functions described herein related to wireless communication, including, for example, determining a set of PDCCHs to be transmitted in a control region, transmitting an ePCFICH, and transmitting the set of PDCCHs in the control region. Alternatively, the code 1025 may not be directly executable by the base station processor 1010 but be configured to cause the base station 105-*b* (e.g., when compiled and executed) to perform various of the functions described herein.

The base station processor 1010 may include an intelligent hardware device, e.g., a central processing unit (CPU), a microcontroller, an ASIC, etc. The base station processor 1010 may process information received through the base station transceiver(s) 1050, the base station communicator 1030, or the network communicator 1040. The base station processor 1010 may also process information to be sent to the transceiver(s) 1050 for transmission through the antenna(s) 1055, to the base station communicator 1030, for transmission to one or more other base stations 105-*e* and 105-*f*, or to the network communicator 1040 for transmission to a core network 130-*a*, which may be an example of one or more aspects of the core network 130 described with reference to FIG. 1. The base station processor 1010 may handle, alone or in connection with the base station wireless communication manager 1075, various aspects of communicating over (or managing communications over) one or more radio frequency spectrum bands, such as a contention-free radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a contention-based radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner)).

The base station transceiver(s) 1050 may include a modem configured to modulate packets and provide the modulated packets to the base station antenna(s) 1055 for transmission, and to demodulate packets received from the base station antenna(s) 1055. The base station transceiver(s) 1050 may, in some examples, be implemented as one or more base station transmitters and one or more separate base station receivers. The base station transceiver(s) 1050 may support communications in the one or more radio frequency spectrum bands. The base station transceiver(s) 1050 may be configured to communicate bi-directionally, via the antenna(s) 1055, with one or more UE devices, such as one or more of the UEs 115 described with reference to FIGS. 1-3, or one or more of the device 605 described with reference to FIGS. 6 and 7. The base station 105-d may, for example, include multiple base station antennas 1055 (e.g., an antenna array). The base station 105-d may communicate with the core network 130-a through the network communicator 1040. The base station 105-d may also communicate with other base stations, such as the base stations 105-e and 105-f, using the base station communicator 1030.

The base station wireless communication manager 1075 may be configured to program or control some or all of the features or functions described with reference to FIGS. 1-7 related to wireless communication over one or more radio frequency spectrum bands. In some examples, the base station wireless communication manager 1075 may include a base station contention-free RF spectrum band manager 1065 configured to handle communications in the contention-free radio frequency spectrum band, and a base station contention-based RF spectrum band manager 1070 configured to handle communications in the contention-based radio frequency spectrum band. The base station wireless communication manager 1075, or portions of it, may include a processor, or some or all of the functions of the base station wireless communication manager 1075 may be performed by the base station processor 1010 or in connection with the base station processor 1010. In some examples, the base station wireless communication manager 1075 may be an example of the wireless communication manager 620 described with reference to FIGS. 6 and 7.

Figure 11:
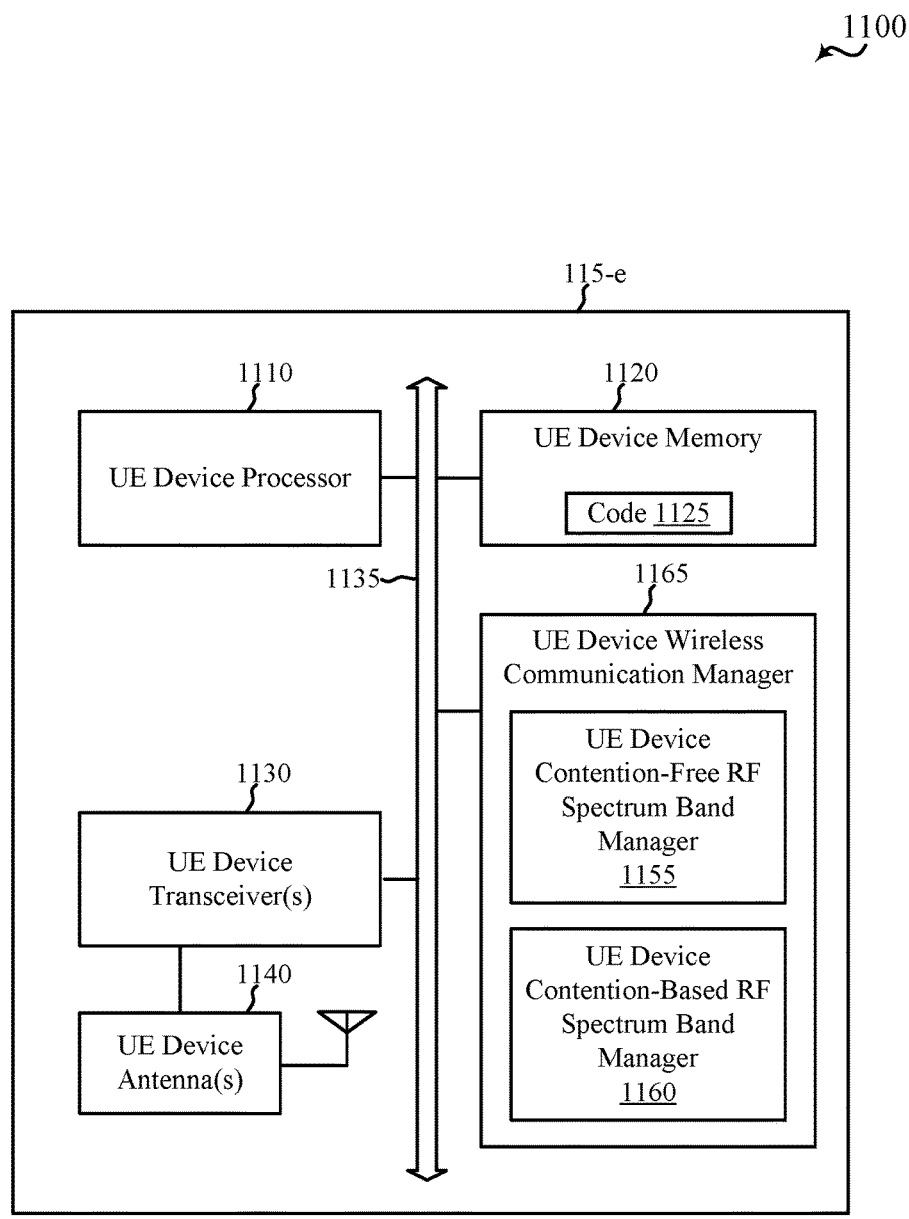
FIG. 11 shows a diagram of a UE device for use in wireless communication, in accordance with various aspects of the present disclosure.

FIG. 11 shows a diagram 1100 of a UE 115-e for use in wireless communication, in accordance with various aspects of the present disclosure. The UE 115-e may have various configurations and may be a wireless communication device, a personal computer (e.g., a laptop computer, a netbook computer, a tablet computer, etc.), a handheld device, a cellular telephone, a smart phone, a cordless phone, a wireless modem, a wireless local loop station, a personal digital assistant (PDA), a digital video recorder (DVR), an internet appliance, a gaming console, an e-reader, etc. The UE 115-e may, in some examples, have an internal power supply (not shown), such as a small battery, to facilitate mobile or remote operation. In some examples, the UE 115-e may be an example of aspects of one or more of the UEs 115 described with reference to FIGS. 1-3. The UE 115-e may be configured to implement at least some of the UE device features and functions described with reference to FIGS. 1-5, 8, and 9.

The UE 115-e may include a UE device processor 1110, a UE device memory 1120, at least one UE device transceiver (represented by UE device transceiver(s) 1130), at least one UE device antenna (represented by UE device antenna(s) 1140), or a UE device wireless communication manager 1165, which may be an example of a wireless communication manager 820 as described with reference to FIGS. 8 and 9. Each of these components may be in communication with each other, directly or indirectly, over one or more buses 1135.

The UE device memory 1120 may include RAM or ROM. The UE device memory 1120 may store computer-readable, computer-executable code 1125 containing instructions executable by the UE device processor 1110 to perform various functions described herein related to wireless communication, including, for example, receiving an ePCFICH, receiving a control region including a set of PDCCHs, and searching for at least one PDCCH within the control region based at least in part on receiving the ePCFICH. Alternatively, the code 1125 may not be directly executable by the UE device processor 1110 but be configured to cause the UE 115-e (e.g., when compiled and executed) to perform various of the functions described herein.

The UE device processor 1110 may include an intelligent hardware device, e.g., a CPU, a microcontroller, an ASIC, etc. The UE device processor 1110 may process information received through the UE device transceiver(s) 1130 or information to be sent to the UE device transceiver(s) 1130 for transmission through the UE device antenna(s) 1140. The UE device processor 1110 may handle, alone or in connection with the UE device wireless communication manager 1165, various aspects of communicating over (or managing communications over) one or more radio frequency spectrum bands, such as a contention-free radio frequency spectrum band (e.g., a radio frequency spectrum band for which transmitting devices may not contend for access because the radio frequency spectrum band is licensed to particular users for particular uses (e.g., a licensed radio frequency spectrum band usable for LTE/LTE-A communications)) or a contention-based radio frequency spectrum band (e.g., a radio frequency spectrum band for which transmitting devices may need to contend for access (e.g., a radio frequency spectrum band that is available for unlicensed use, such as Wi-Fi use, or a radio frequency spectrum band that is available for use by multiple operators in an equally shared or prioritized manner))

The UE device transceiver(s) 1130 may include a modem configured to modulate packets and provide the modulated packets to the UE device antenna(s) 1140 for transmission, and to demodulate packets received from the UE device antenna(s) 1140. The UE device transceiver(s) 1130 may, in some examples, be implemented as one or more UE device transmitters and one or more separate UE device receivers. The UE transceiver(s) 1130 may support communications in the one or more radio frequency spectrum bands. The UE device transceiver(s) 1130 may be configured to communicate bi-directionally, via the UE device antenna(s) 1140, with one or more base stations or other devices, such as one or more of the base stations 105 described with reference to FIGS. 1-3 and 10. While the UE 115-*e* may include a single UE device antenna, there may be examples in which the UE 115-*e* may include multiple UE device antennas 1140.

The UE device wireless communication manager 1165 may be configured to program or control some or all of the features or functions described with reference to FIGS. 1-5, 8, and 9 related to wireless communication over one or more radio frequency spectrum bands. In some examples, the UE device wireless communication manager 1165 may include a UE device contention-free RF spectrum band manager 1155 configured to handle communications in the contention-free radio frequency spectrum band, and a UE device contention-based RF spectrum band manager 1160 configured to handle communications in the contention-based radio frequency spectrum band. The UE device wireless communication manager 1165, or portions of it, may include a processor, or some or all of the functions of the UE device wireless communication manager 1165 may be performed by the UE device processor 1110 or in connection with the UE device processor 1110. In some examples, the UE device wireless communication manager 1165 may be an example of the wireless communication manager 820 described with reference to FIGS. 8 and 9.

Figure 12:
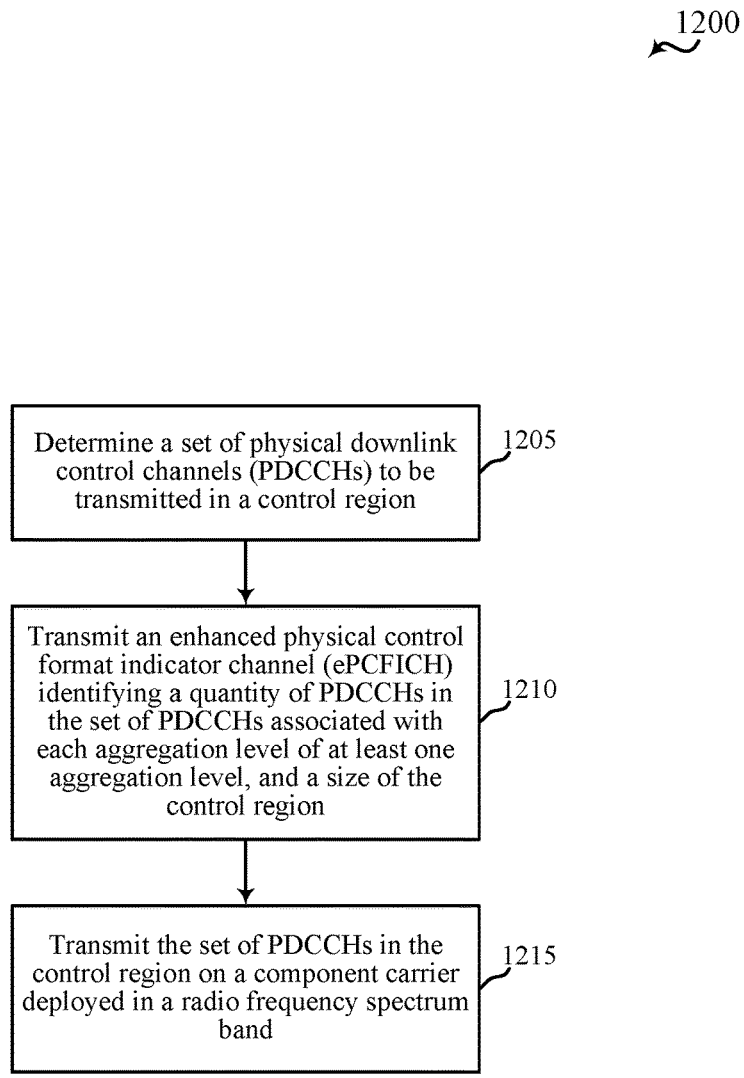
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the base stations 105 described with reference to FIGS. 1-3 and 10, or aspects of the device 605 described with reference to FIG. 6. In some examples, a base station or device may perform one or more of the functions described below using special-purpose hardware.

At 1205, the method 1200 may include determining a set of PDCCHs to be transmitted in a control region. In some examples, determining the set of PDCCHs to be transmitted in the control region may include formatting a subset of PDCCHs for a single UE device using a same aggregation level (e.g., all of the PDCCHs to be transmitted to a single UE device may be formatted using a same aggregation level). The operation(s) at 1205 may be performed using the wireless communication manager 620 described with reference to FIGS. 6, 7, and 10, or the control region formatter 635 described with reference to FIGS. 6 and 7.

At 1210, the method 1200 may include transmitting an ePCFICH identifying a quantity of PDCCHs in the set of PDCCHs associated with each aggregation level of at least one aggregation level, and a size of the control region. In some examples, the at least one aggregation level may include a plurality of aggregation levels. In some examples, the ePCFICH may identify a first quantity of PDCCHs in the set of PDCCHs associated with a first aggregation level of the at least one aggregation level (or a second quantity of the PDCCHs associated with a second aggregation level, etc.) by identifying a plurality of modulation orders associated with the first quantity of PDCCHs, and a plurality of sub-quantities of the first quantity of PDCCHs associated with each modulation order of the plurality of modulation orders. The operation(s) at 1210 may be performed using the wireless communication manager 620 described with reference to FIGS. 6, 7, and 10, or the ePCFICH transmission manager 640 described with reference to FIGS. 6 and 7.

At 1215, the method 1200 may include transmitting the set of PDCCHs in the control region on a component carrier deployed in a radio frequency spectrum band. In some examples, the PDCCHs may be transmitted in the control region in a predetermined order based at least in part on the plurality of aggregation levels. In some examples, the component carrier may include an eCC. The operation(s) at 1215 may be performed using the wireless communication manager 620 described with reference to FIGS. 6, 7, and 10, or the control region transmission manager 645 described with reference to FIGS. 6 and 7.

Thus, the method 1200 may provide for wireless communication. It should be noted that the method 1200 is just one implementation and that the operations of the method 1200 may be rearranged or otherwise modified such that other implementations are possible.

Figure 13:
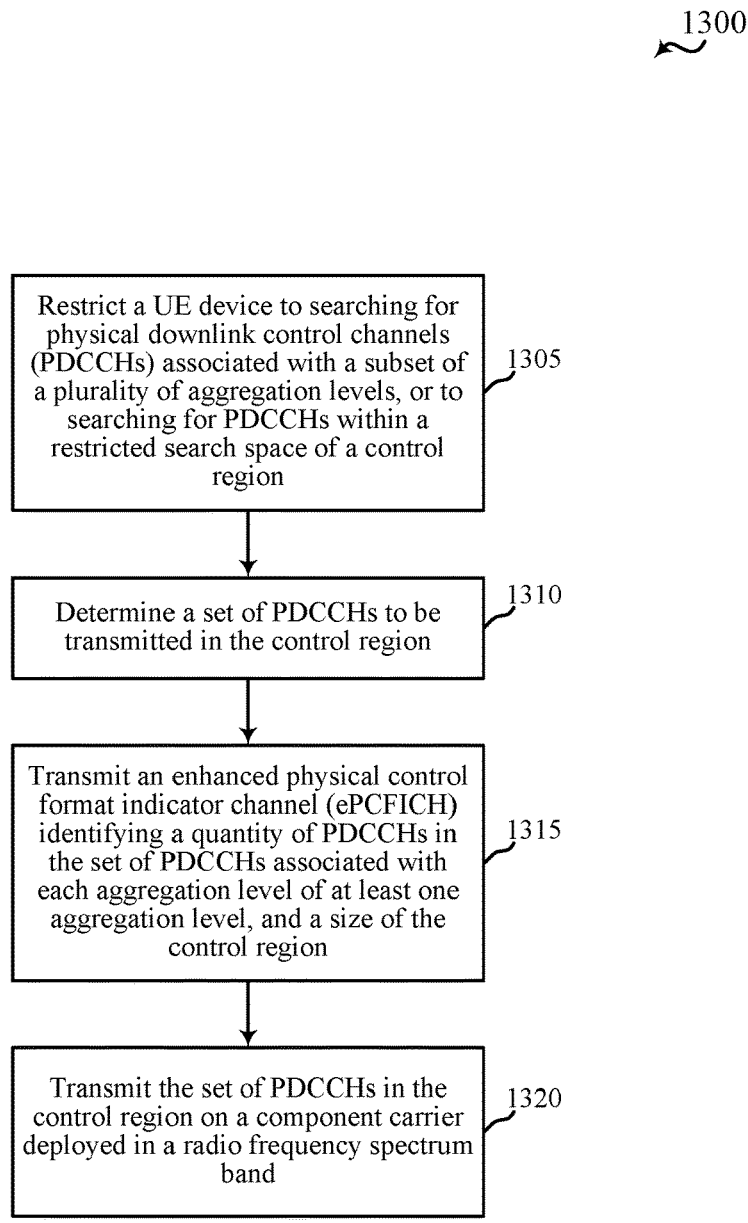
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the base stations 105 described with reference to FIGS. 1-3 and 10, or aspects of the device 605 described with reference to FIG. 6. In some examples, a base station or device may perform one or more of the functions described below using special-purpose hardware.

At 1305, the method 1300 may include restricting a UE device to searching for PDCCHs associated with a subset of a plurality of aggregation levels, or to searching for PDCCHs within a restricted search space of a control region. In some examples, the restricting may include signaling a search restriction to the UE device. In some examples, the same or different search restrictions may be signaled to different UE devices. The operation(s) at 1305 may be performed using the wireless communication manager 620 described with reference to FIGS. 6, 7, and 10, or the PDCCH search restrictor 705 described with reference to FIG. 7.

At 1310, the method 1300 may include determining a set of PDCCHs to be transmitted in the control region. In some examples, determining the set of PDCCHs to be transmitted in the control region may include formatting a subset of PDCCHs for a single UE device using a same aggregation level (e.g., all of the PDCCHs to be transmitted to a single UE device may be formatted using a same aggregation level). The operation(s) at 1310 may be performed using the wireless communication manager 620 described with reference to FIGS. 6, 7, and 10, or the control region formatter 635 described with reference to FIGS. 6 and 7.

At 1315, the method 1300 may include transmitting an ePCFICH identifying a quantity of PDCCHs in the set of PDCCHs associated with each aggregation level of at least one aggregation level, and a size of the control region. In some examples, the at least one aggregation level may include more than one or all of the plurality of aggregation levels. In some examples, the ePCFICH may identify a first quantity of PDCCHs in the set of PDCCHs associated with a first aggregation level of the at least one aggregation level (or a second quantity of the PDCCHs associated with a second aggregation level, etc.) by identifying a plurality of modulation orders associated with the first quantity of PDCCHs, and a plurality of sub-quantities of the first quantity of PDCCHs associated with each modulation order of the plurality of modulation orders. The operation(s) at 1315 may be performed using the wireless communication manager 620 described with reference to FIGS. 6, 7, and 10, or the ePCFICH transmission manager 640 described with reference to FIGS. 6 and 7.

At 1320, the method 1300 may include transmitting the set of PDCCHs in the control region on a component carrier deployed in a radio frequency spectrum band. In some examples, the PDCCHs may be transmitted in the control region in a predetermined order based at least in part on the plurality of aggregation levels. In some examples, the component carrier may include an eCC. The operation(s) at 1320 may be performed using the wireless communication manager 620 described with reference to FIGS. 6, 7, and 10, or the control region transmission manager 645 described with reference to FIGS. 6 and 7.

Thus, the method 1300 may provide for wireless communication. It should be noted that the method 1300 is just one implementation and that the operations of the method 1300 may be rearranged or otherwise modified such that other implementations are possible.

Figure 14:
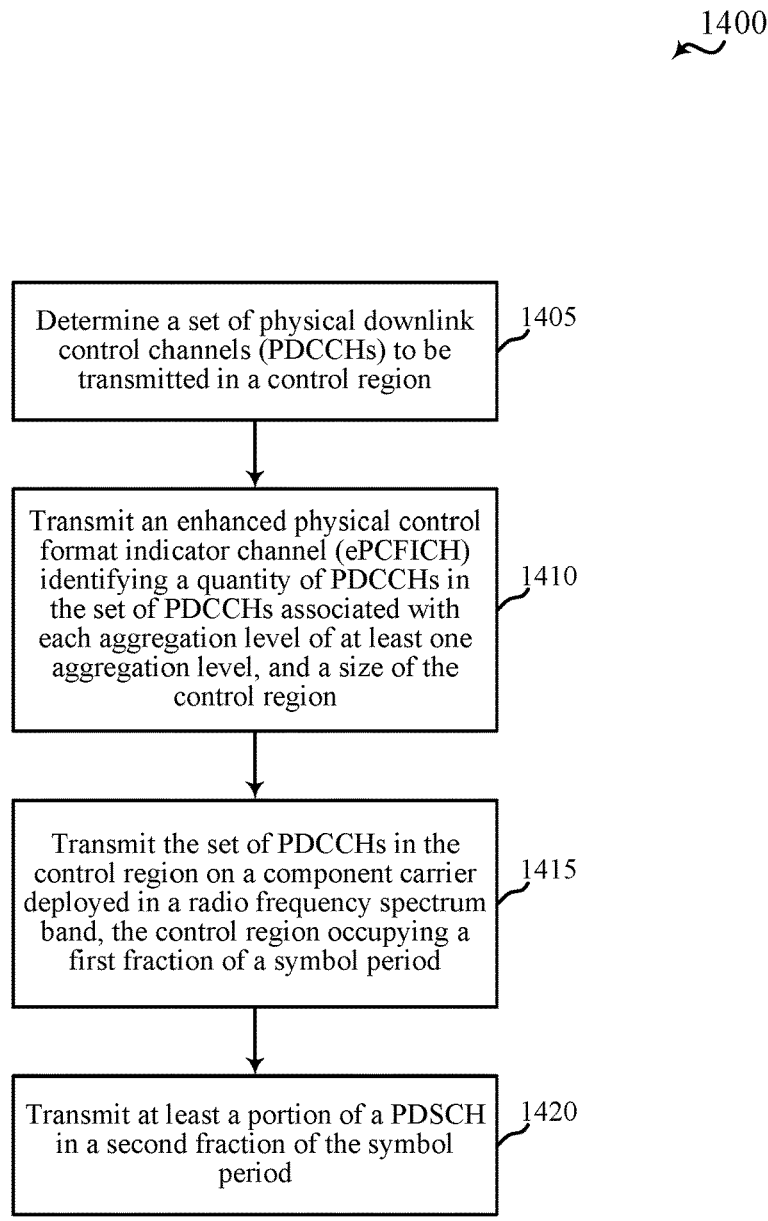
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the base stations 105 described with reference to FIGS. 1-3 and 10, or aspects of the device 605 described with reference to FIG. 6. In some examples, a base station or device may perform one or more of the functions described below using special-purpose hardware.

At 1405, the method 1400 may include determining a set of PDCCHs to be transmitted in a control region. In some examples, determining the set of PDCCHs to be transmitted in the control region may include formatting a subset of PDCCHs for a single UE device using a same aggregation level (e.g., all of the PDCCHs to be transmitted to a single UE device may be formatted using a same aggregation level). The operation(s) at 1405 may be performed using the wireless communication manager 620 described with reference to FIGS. 6, 7, and 10, or the control region formatter 635 described with reference to FIGS. 6 and 7.

At 1410, the method 1400 may include transmitting an ePCFICH identifying a quantity of PDCCHs in the set of PDCCHs associated with each aggregation level of at least one aggregation level, and a size of the control region. In some examples, the at least one aggregation level may include a plurality of aggregation levels. In some examples, the ePCFICH may identify a first quantity of PDCCHs in the set of PDCCHs associated with a first aggregation level of the at least one aggregation level (or a second quantity of the PDCCHs associated with a second aggregation level, etc.) by identifying a plurality of modulation orders associated with the first quantity of PDCCHs, and a plurality of sub-quantities of the first quantity of PDCCHs associated with each modulation order of the plurality of modulation orders. The operation(s) at 1410 may be performed using the wireless communication manager 620 described with reference to FIGS. 6, 7, and 10, or the ePCFICH transmission manager 640 described with reference to FIGS. 6 and 7.

At 1415, the method 1400 may include transmitting the set of PDCCHs in the control region on a component carrier deployed in a radio frequency spectrum band. The control region may occupy a first fraction of a symbol period (e.g., less than all of the symbol period). In some examples, the PDCCHs may be transmitted in the control region in a predetermined order based at least in part on the plurality of aggregation levels. In some examples, the method 1400 may include boosting the transmit power of at least one of the PDCCHs transmitted in the control region. The transmit power may be boosted based at least in part on the control region occupying the first fraction of the symbol period. In some examples, the component carrier may include an eCC. The operation(s) at 1415 may be performed using the wireless communication manager 620 described with reference to FIGS. 6, 7, and 10, the control region transmission manager 645 described with reference to FIGS. 6 and 7, or the PDCCH transmit power booster 710 described with reference to FIG. 7.

At 1420, the method 1400 may include transmitting at least a portion of a PDSCH in a second fraction of the symbol period. The operation(s) at 1420 may be performed using the wireless communication manager 620 described with reference to FIGS. 6, 7, and 10, or the PDSCH transmission manager 715 described with reference to FIG. 7.

Thus, the method 1400 may provide for wireless communication. It should be noted that the method 1400 is just one implementation and that the operations of the method 1400 may be rearranged or otherwise modified such that other implementations are possible.

In some examples, aspects of the methods 1200, 1300, or 1400 described with reference to FIGS. 12-14 may be combined.

Figure 15:
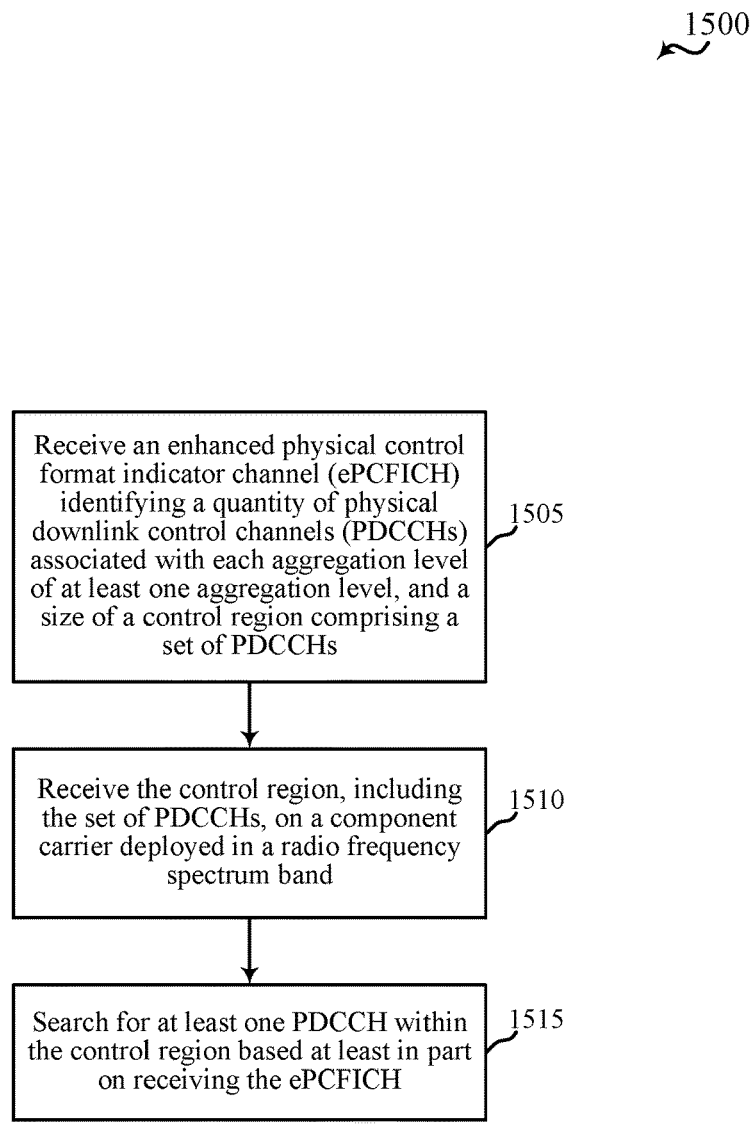
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115 described with reference to FIGS. 1-3 and 11, or aspects of the device 815 described with reference to FIG. 8. In some examples, a UE device may perform one or more of the functions described below using special-purpose hardware.

At 1505, the method 1500 may include receiving an ePCFICH identifying a quantity of PDCCHs associated with each aggregation level of at least one aggregation level, and a size of a control region including a set of PDCCHs. In some examples, the at least one aggregation level may include a plurality of aggregation levels. In some examples, the ePCFICH may identify a first quantity of PDCCHs in the set of PDCCHs associated with a first aggregation level of the at least one aggregation level (or a second quantity of the PDCCHs associated with a second aggregation level, etc.) by identifying a plurality of modulation orders associated with the first quantity of PDCCHs, and a plurality of sub-quantities of the first quantity of PDCCHs associated with each modulation order of the plurality of modulation orders. The operation(s) at 1505 may be performed using the wireless communication manager 820 described with reference to FIGS. 8, 9, and 11, or the ePCFICH reception manager 835 described with reference to FIGS. 8 and 9.

At 1510, the method 1500 may include receiving the control region, including the set of PDCCHs, on a component carrier deployed in a radio frequency spectrum band. In some examples, the PDCCHs may be received in the control region in a predetermined order based at least in part on the plurality of aggregation levels. In some examples, the component carrier may include an eCC. The operation(s) at 1510 may be performed using the wireless communication manager 820 described with reference to FIGS. 8, 9, and 11, or the control region reception manager 840 described with reference to FIGS. 8 and 9.

At 1515, the method 1500 may include searching for at least one PDCCH within the control region based at least in part on receiving the ePCFICH. In some examples, the searching may include searching for a plurality of PDCCHs having a same aggregation level (e.g., all of the PDCCHs targeted for a UE device performing the method 1500 may be formatted using a same aggregation level). The operation(s) at 1515 may be performed using the wireless communication manager 820 described with reference to FIGS. 8, 9, and 11, or the PDCCH search manager 845 described with reference to FIGS. 8 and 9.

Thus, the method 1500 may provide for wireless communication. It should be noted that the method 1500 is just one implementation and that the operations of the method 1500 may be rearranged or otherwise modified such that other implementations are possible.

Figure 16:
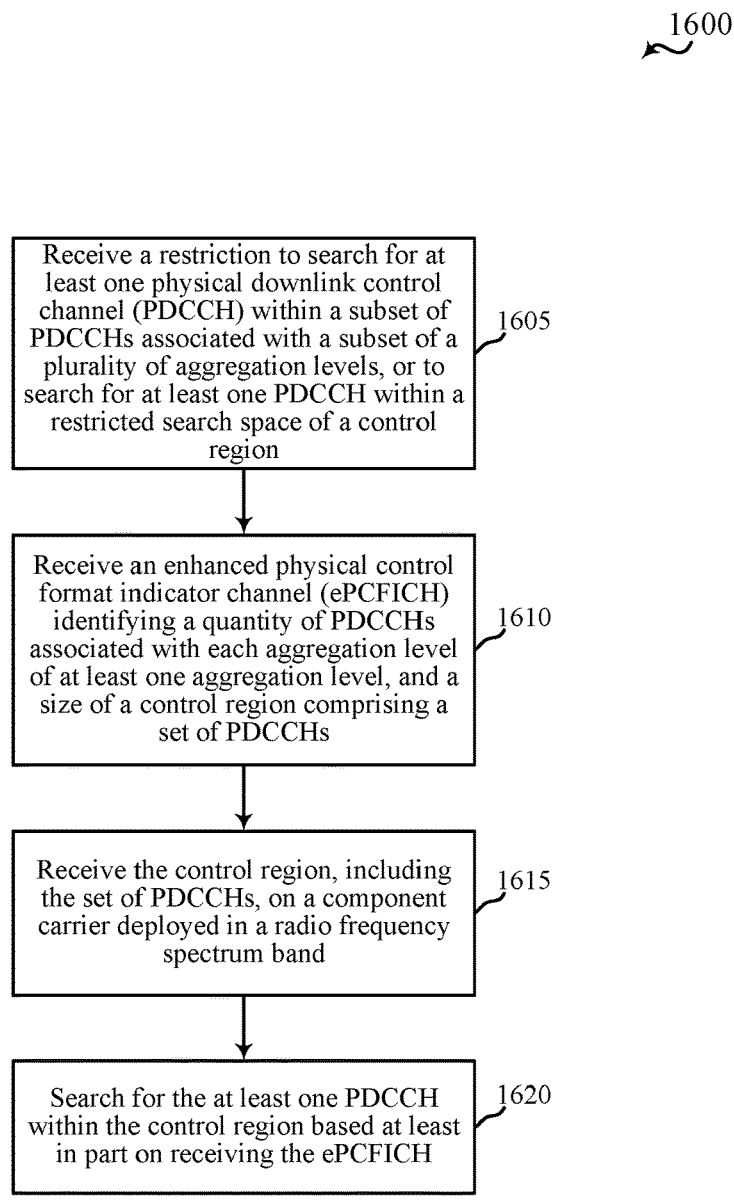
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs 115 described with reference to FIGS. 1-3 and 11, or aspects of the device 815 described with reference to FIG. 8. In some examples, a UE device may perform one or more of the functions described below using special-purpose hardware.

At 1605, the method 1600 may include receiving a restriction to search for at least one PDCCH within a subset of PDCCHs associated with a subset of a plurality of aggregation levels, or to search for at least one PDCCH within a restricted search space of a control region. In some examples, a search restriction may be received in information signaled to a UE device performing the method 1600. The operation(s) at 1605 may be performed using the wireless communication manager 820 described with reference to FIGS. 8, 9, and 11, or the PDCCH search restrictor 905 described with reference to FIG. 9.

At 1610, the method 1600 may include receiving an ePCFICH identifying a quantity of PDCCHs associated with each aggregation level of at least one aggregation level, and a size of a control region including a set of PDCCHs. In some examples, the at least one aggregation level may include a plurality of aggregation levels. In some examples, the ePCFICH may identify a first quantity of PDCCHs in the set of PDCCHs associated with a first aggregation level of the at least one aggregation level (or a second quantity of the PDCCHs associated with a second aggregation level, etc.) by identifying a plurality of modulation orders associated with the first quantity of PDCCHs, and a plurality of sub-quantities of the first quantity of PDCCHs associated with each modulation order of the plurality of modulation orders. The operation(s) at 1610 may be performed using the wireless communication manager 820 described with reference to FIGS. 8, 9, and 11, or the ePCFICH reception manager 835 described with reference to FIGS. 8 and 9.

At 1615, the method 1600 may include receiving the control region, including the set of PDCCHs, on a component carrier deployed in a radio frequency spectrum band. In some examples, the PDCCHs may be received in the control region in a predetermined order based at least in part on the plurality of aggregation levels. In some examples, the component carrier may include an eCC. The operation(s) at 1615 may be performed using the wireless communication manager 820 described with reference to FIGS. 8, 9, and 11, or the control region reception manager 840 described with reference to FIGS. 8 and 9.

At 1620, the method 1600 may include searching for the at least one PDCCH within the control region based at least in part on receiving the ePCFICH, and based at least in part on the search restriction(s) received at 1605. In some examples, the searching may include searching for a plurality of PDCCHs having a same aggregation level (e.g., all of the PDCCHs targeted for the UE device performing the method 1600 may be formatted using a same aggregation level). The operation(s) at 1620 may be performed using the wireless communication manager 820 described with reference to FIGS. 8, 9, and 11, or the PDCCH search manager 845 described with reference to FIGS. 8 and 9.

Thus, the method 1600 may provide for wireless communication. It should be noted that the method 1600 is just one implementation and that the operations of the method 1600 may be rearranged or otherwise modified such that other implementations are possible.

Figure 17:
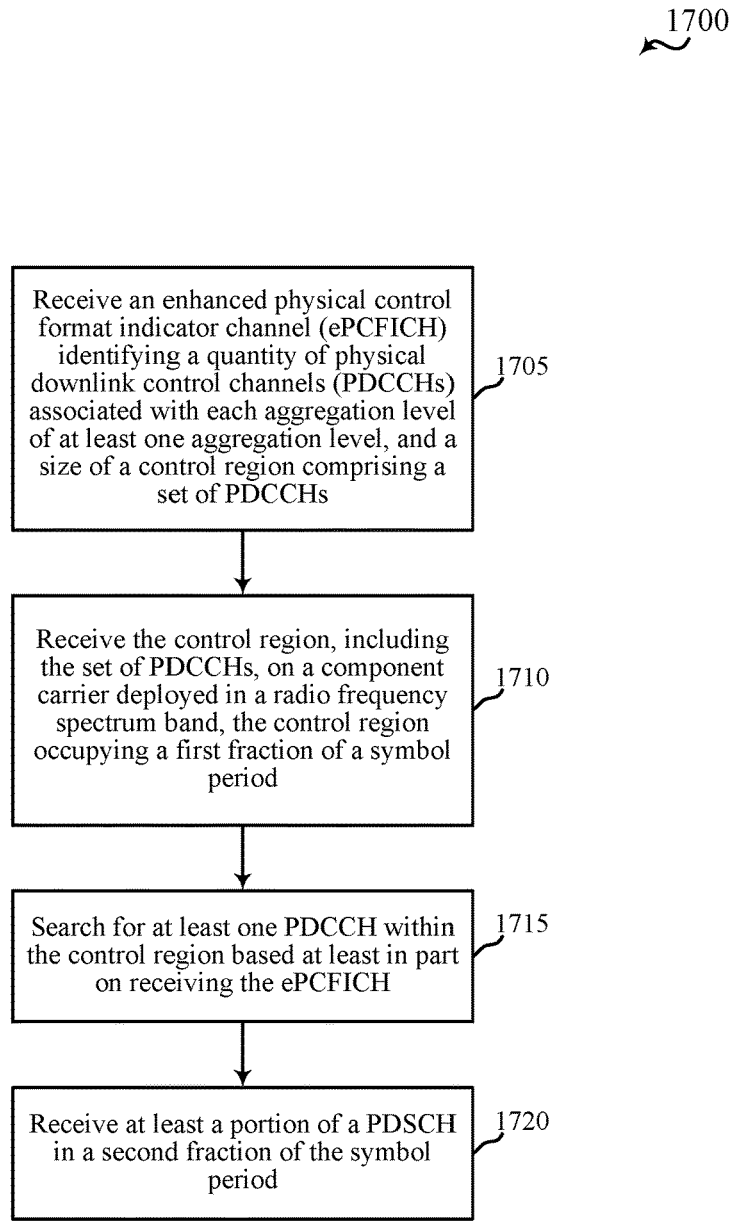
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the UEs 115 described with reference to FIGS. 1-3 and 11, or aspects of the device 815 described with reference to FIG. 8. In some examples, a UE device may perform one or more of the functions described below using special-purpose hardware.

At 1705, the method 1700 may include receiving an ePCFICH identifying a quantity of PDCCHs associated with each aggregation level of at least one aggregation level, and a size of a control region including a set of PDCCHs. In some examples, the at least one aggregation level may include a plurality of aggregation levels. In some examples, the ePCFICH may identify a first quantity of PDCCHs in the set of PDCCHs associated with a first aggregation level of the at least one aggregation level (or a second quantity of the PDCCHs associated with a second aggregation level, etc.) by identifying a plurality of modulation orders associated with the first quantity of PDCCHs, and a plurality of sub-quantities of the first quantity of PDCCHs associated with each modulation order of the plurality of modulation orders. The operation(s) at 1705 may be performed using the wireless communication manager 820 described with reference to FIGS. 8, 9, and 11, or the ePCFICH reception manager 835 described with reference to FIGS. 8 and 9.

At 1710, the method 1700 may include receiving the control region, including the set of PDCCHs, on a component carrier deployed in a radio frequency spectrum band. The control region may occupy a first fraction of a symbol period (e.g., less than all of the symbol period). In some examples, the PDCCHs may be received in the control region in a predetermined order based at least in part on the plurality of aggregation levels. In some examples, the method 1700 may include receiving at least one PDCCH in the control region at a boosted transmit power. The transmit power may be boosted based at least in part on the control region occupying the first fraction of the symbol period. In some examples, the component carrier may include an eCC. The operation(s) at 1710 may be performed using the wireless communication manager 820 described with reference to FIGS. 8, 9, and 11, or the control region reception manager 840 described with reference to FIGS. 8 and 9.

At 1715, the method 1700 may include searching for at least one PDCCH within the control region based at least in part on receiving the ePCFICH. In some examples, the searching may include searching for a plurality of PDCCHs having a same aggregation level (e.g., all of the PDCCHs targeted for a UE device performing the method 1700 may be formatted using a same aggregation level). The operation(s) at 1715 may be performed using the wireless communication manager 820 described with reference to FIGS. 8, 9, and 11, or the PDCCH search manager 845 described with reference to FIGS. 8 and 9.

At 1720, the method 1700 may include receiving at least a portion of a PDSCH in a second fraction of the symbol period. The operation(s) at 1720 may be performed using the wireless communication manager 820 described with reference to FIGS. 8, 9, and 11, or the PDSCH reception manager 910 described with reference to FIG. 9.

Thus, the method 1700 may provide for wireless communication. It should be noted that the method 1700 is just one implementation and that the operations of the method 1700 may be rearranged or otherwise modified such that other implementations are possible.

In some examples, aspects of the methods 1500, 1600, or 1700 described with reference to FIGS. 15-17 may be combined.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM, CD-ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

What is claimed is:

1. A method for wireless communication at a base station, comprising:
   determining a set of physical downlink control channels (PDCCHs) to be transmitted in a control region;
   transmitting an enhanced physical control format indicator channel (ePCFICH) identifying a quantity of PDCCHs in the set of PDCCHs associated with each aggregation level of a plurality of aggregation levels, and a size of the control region;
   transmitting the set of PDCCHs in the control region on a component carrier deployed in a radio frequency spectrum band, wherein the control region occupies a first fraction of a symbol period across a first plurality of subcarriers of a channel and at least a portion of a data region occupies a second fraction of the symbol period across a second plurality of subcarriers of the channel; and boosting the transmit power of at least one PDCCH transmitted in the control region based at least in part on the control region occupying the first fraction of the symbol period.

2. The method of claim 1, further comprising:
restricting a user equipment (UE) device to searching for PDCCHs associated with a subset of the plurality of aggregation levels.

3. The method of claim 1, further comprising:
restricting a user equipment (UE) device to searching for PDCCHs within a restricted search space of the control region.

4. The method of claim 1, wherein the ePCFICH identifies the quantity of PDCCHs in the set of PDCCHs associated with an aggregation level by identifying a plurality of modulation orders associated with the quantity of PDCCHs.

5. The method of claim 1, wherein determining the set of PDCCHs to be transmitted in the control region comprises:
formatting a subset of PDCCHs for a single user equipment (UE) device using a same aggregation level.

6. The method of claim 1, wherein the component carrier comprises an enhanced component carrier (eCC).

7. The method of claim 1, further comprising:
transmitting at least a portion of a physical downlink shared channel (PDSCH) in the second fraction of the symbol period.

8. A device for wireless communication, comprising:
a processor;
memory in electronic communication with the processor; and
instructions stored in the memory, the instructions being executable by the processor to:
determine a set of physical downlink control channels (PDCCHs) to be transmitted in a control region;
transmit an enhanced physical control format indicator channel (ePCFICH) identifying a quantity of PDCCHs in the set of PDCCHs associated with each aggregation level of a plurality of aggregation levels, and a size of the control region;
transmit the set of PDCCHs in the control region on a component carrier deployed in a radio frequency spectrum band, wherein the control region occupies a first fraction of a symbol period across a first plurality of subcarriers of a channel and at least a portion of a data region occupies a second fraction of the symbol period across a second plurality of subcarriers of the channel; and
boosting the transmit power of at least one PDCCH transmitted in the control region based at least in part on the control region occupying the first fraction of the symbol period.

9. The device of claim 8, wherein the ePCFICH identifies the quantity of PDCCHs in the set of PDCCHs associated with an aggregation level by identifying a plurality of modulation orders associated with the quantity of PDCCHs.

10. The device of claim 8, the instructions further executable by the processor to:
restrict a user equipment (UE) device to searching for PDCCHs associated with a subset of the plurality of aggregation levels.

11. A method for wireless communication at a user equipment (UE) device, comprising:
receiving an enhanced physical control format indicator channel (ePCFICH) identifying a quantity of physical downlink control channels (PDCCHs) associated with each aggregation level of a plurality of aggregation levels, and a size of a control region comprising a set of PDCCHs;

receiving the control region, including the set of PDCCHs, on a component carrier deployed in a radio frequency spectrum band, wherein the control region occupies a first fraction of a symbol period across a first plurality of subcarriers of a channel and at least a portion of a data region occupies a second fraction of the symbol period across a second plurality of subcarriers of the channel;

receiving at least one PDCCH in the control region at a boosted transmit power based at least in part on the control region occupying the first fraction of the symbol period;
and
searching for at least one PDCCH within the control region based at least in part on receiving the ePCFICH.

12. The method of claim 11, further comprising:
receiving a restriction to search for the at least one PDCCH within a subset of PDCCHs associated with a subset of the plurality of aggregation levels.

13. The method of claim 11, further comprising:
receiving a restriction to search for the at least one PDCCH within a restricted search space of the control region.

14. The method of claim 11, wherein the ePCFICH identifies a quantity of PDCCHs in the set of PDCCHs associated with an aggregation level by identifying a plurality of modulation orders associated with the quantity of PDCCHs.

15. The method of claim 11, further comprising:
searching for a plurality of PDCCHs having a same aggregation level.

16. The method of claim 11, wherein the component carrier comprises an enhanced component carrier (eCC).

17. The method of claim 11, further comprising:
receiving at least a portion of a physical downlink share channel (PDSCH) in the second fraction of the symbol period.

18. A device for wireless communication, comprising:
a processor;
memory in electronic communication with the processor; and
instructions stored in the memory, the instructions being executable by the processor to:
receive an enhanced physical control format indicator channel (ePCFICH) identifying a quantity of physical downlink control channels (PDCCHs) associated with each aggregation level of a plurality of aggregation levels, and a size of a control region comprising a set of PDCCHs;
receive the control region, including the set of PDCCHs, on a component carrier deployed in a radio frequency spectrum band, wherein the control region occupies a first fraction of a symbol period across a first plurality of subcarriers of a channel and at least a portion of a data region occupies a remaining second fraction of the symbol period across a second plurality of subcarriers of the channel;
receiving at least one PDCCH in the control region at a boosted transmit power based at least in part on the control region occupying the first fraction of the symbol period;

and
search for at least one PDCCH within the control region based at least in part on receiving the ePCFICH.

19. The device of claim 18, wherein the ePCFICH identifies a quantity of PDCCHs in the set of PDCCHs associated with an aggregation level by identifying a plurality of modulation orders associated with the quantity of PDCCHs.

20. The device of claim 18, the instructions further executable by the processor to:
receive a restriction to search for the at least one PDCCH within a subset of PDCCHs associated with a subset of the plurality of aggregation levels.

* * * * *